US012709014B2

(12) United States Patent
Gurunandan Rao et al.

(10) Patent No.: US 12,709,014 B2
(45) Date of Patent: Aug. 18, 2026

(54) SPATIAL MAPPING AND PLANNING WITH LANGUAGE MODELS USING KNOWLEDGE GRAPHS

(71) Applicant: NVIDIA Corporation, Santa Clara, CA (US)

(72) Inventors: Rohan Gurunandan Rao, San Jose, CA (US); Sugandha Sharma, Cambridge, MA (US)

(73) Assignee: NVIDIA CORPORATION, Santa Clara, CA (US)

( * ) Notice: Subject to any disclaimer, the term of this patent is extended or adjusted under 35 U.S.C. 154(b) by 34 days.

(21) Appl. No.: 19/020,995

(22) Filed: Jan. 14, 2025

(65) Prior Publication Data

US 2026/0200092 A1 Jul. 16, 2026

(51) Int. Cl.
*B25J 9/16* (2006.01)
*G06N 5/022* (2023.01)

(52) U.S. Cl.
CPC ............. *B25J 9/1697* (2013.01); *B25J 9/161* (2013.01); *G06N 5/022* (2013.01)

(58) Field of Classification Search
CPC .......... G06N 5/022; B25J 9/161; B25J 9/1697
See application file for complete search history.

(56) References Cited

U.S. PATENT DOCUMENTS 12,555,386 B1 * 2/2026 Krishnan ............... G06V 20/56
2020/0364619 A1 * 11/2020 Kazemi .................. G06N 3/086
2022/0207379 A1 * 6/2022 E ........................... G06N 5/022
2024/0095805 A1 * 3/2024 Sztyler .................. G06N 5/022
2025/0292107 A1 * 9/2025 Rossi ...................... G06N 5/02

* cited by examiner

*Primary Examiner* — Wade Miles
*Assistant Examiner* — Mohammed Yousef Abuelhawa
(74) *Attorney, Agent, or Firm* — Squire Patton Boggs LLP; Sarah Mirza

(57) ABSTRACT

In various examples, a technique for performing spatial mapping and planning with large language models using knowledge graphs may include querying a temporal knowledge graph to predict a next step that a robotic system is to traverse in an environment, wherein the temporal knowledge graph comprises a graph representation of entities and relationships in the environment, wherein the entities and relationships in the graph representation are produced based on sensor data captured from the environment. The technique also may include receiving additional sensor data captured from the environment. The technique further may include generating, via a machine learning model, spatial and temporal data associated with the additional sensor data. The technique still further may include updating, via the machine learning model, the temporal knowledge graph to include representations of the spatial and temporal data, based on a similarity between the spatial and temporal data and the graph representation.

20 Claims, 15 Drawing Sheets

SPATIAL MAPPING AND PLANNING WITH LANGUAGE MODELS USING KNOWLEDGE GRAPHS

TECHNICAL FIELD

Embodiments of the present disclosure relate generally to natural language processing and machine learning and, more specifically, to techniques for performing spatial mapping and planning with (e.g., large) language models using knowledge graphs.

BACKGROUND

Various types of general reasoning models, including large language models (LLMs), vision language models (VLMs), multi-modal language models (MMLMs), and/or large action models (LAMs), may employ neural networks and/or other types of machine learning models that may be capable of general-purpose language understanding and generation—or, in some instances, other types of data understanding and generation, such as images, audio, video, or sensory data.

Looking more specifically at LLMs, these may be pre-trained on vast datasets of text and/or other types of content and may include large numbers of parameters that allow the LLMs to learn complex patterns in the content. After pre-training of an LLM is complete, the LLM may be capable of using the same types of content to perform a wide range of tasks. The performance of a given LLM on these tasks may be evaluated and/or tracked to assess the strengths and weaknesses of the LLM, compare the capabilities of different LLMs, evaluate the effectiveness of datasets and/or techniques used to train and/or prompt the LLMs, and/or incorporate the LLM in applications and/or environments in which these tasks are performed.

LLMs and/or other types of general reasoning models listed herein may be employed for robotics or automotive path planning, for example, such that through text-based queries, a general reasoning model may predict a next step for a system (such as a vehicle or a robot) to traverse. One limitation of these models when used for path planning, however, is that these models have been ineffective for spatial reasoning because LLMs deal with mapped components as discrete entities, without accounting for possible relations among those discrete entities.

What is needed in the art are more effective techniques to address this spatial reasoning limitation to improve path planning abilities in language models (e.g., LLMs, VLMs, LAMs, MMLMs, etc.) and/or other types of machine learning models.

BRIEF DESCRIPTION OF DRAWINGS

The present systems and methods for spatial mapping and planning with language models using knowledge graphs are described in detail herein with reference to the attached drawing figures, in which.

DETAILED DESCRIPTION

Figure 1:
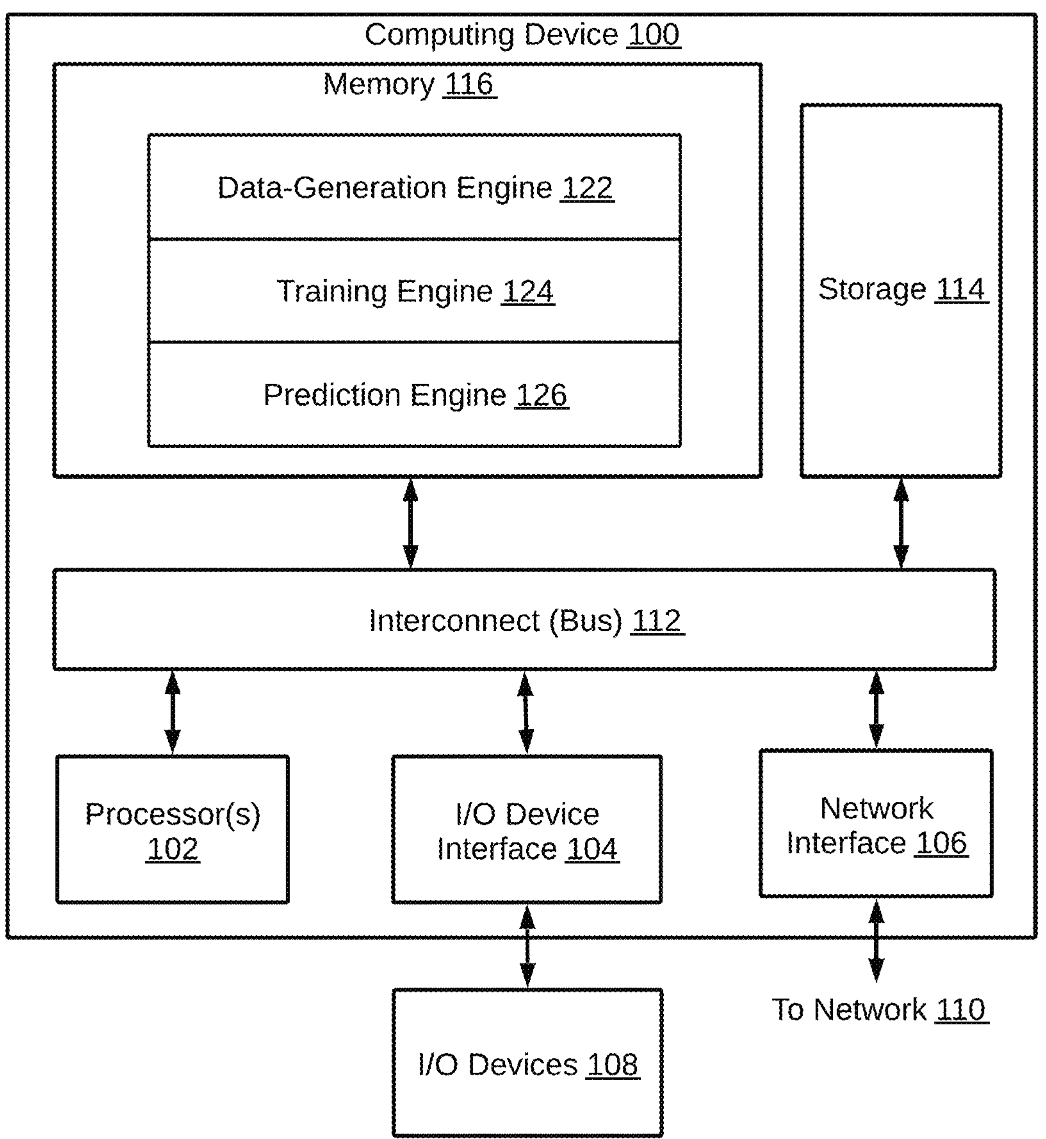
FIG. 1 illustrates a block diagram of a computing system configured to implement one or more aspects of various embodiments.

To address the spatial reasoning limitations of conventional approaches, the systems and methods of the present disclosure may be used to augment a general purpose reasoning model with a temporal knowledge graph (TKG), which may be capable of handling spatial information well by virtue of its structure of entities and relations. For a given environment, the TKG may be updated over time so that the entities and relations represented in the TKG may reflect a current spatial understanding of the environment. The temporally updated TKG may be used to provide a robotic system (such as a vehicle or a robot) with predictive path information. The predictive path information enables the system—e.g. a robot—to traverse a path—e.g. in a home, office building, warehouse, road, or highway—or to enable a portion of a system—e.g., a robotic arm—to traverse a path to perform an operation. Examples of such system may include adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Accordingly, even though one or more visuals within some of the figures may include a sedan-type vehicle, such visuals are not intended to be limiting, so that the components, features, and/or functionality described herein may relate to any other vehicle or machine type—such as autonomous mobile robots (AMRs). In addition, although the present disclosure may be described with respect to navigation in autonomous and/or semi-autonomous robots, this is not intended to be limiting, and the systems and methods described herein may be used in augmented reality, virtual reality, mixed reality, robotics, security and surveillance, autonomous or semi-autonomous machine applications, computer vision, generative modeling, and/or any other technology spaces where navigation may be used. Updates to the TKG may enable prediction of paths with or without obstructions for the autonomous or semiautonomous system/vehicle/machine to circumvent.

A TKG may consist of connected subgraphs, each subgraph representing an event. Nodes in the events may have associated time stamps and may represent entities, which can be locations or objects. The edges of the TKG may encode relationships between the entities. The edges can connect the nodes within one event or between different events, indicating temporal relationships. Nodes and edges can have additional associated features. The relations between events and their nodes may enable identification of relevant past events. TKGs also can represent hierarchical events, where events at a higher level may be connected to events at a lower level. Events at higher levels of hierarchy capture increasingly more complex patterns and behaviors, spanning a longer time interval and involving more entities, allowing for representation and reasoning at a higher level of abstraction.

Graph-based representations may provide at least the following benefits: (i) Complex dependencies in time can be modeled via temporal graphical relations; (ii) Dynamics may not be distributed evenly and hence may require a hierarchical approach to learn in an adaptive manner a representation of the input from different levels of abstraction; (iii) Possible future branching can be captured as a distribution over such graphs. A hierarchical representation may enable scalable handling of both short-term and long-term events by learning from repeating patterns in data and by identifying temporal dependencies at multiple scales.

A first action may be to construct a base level of a knowledge graph using sensor data and/or simultaneous localization and mapping (SLAM) data which a system may traverse. The resulting knowledge graph may be augmented by adding temporal edges that connect the nodes of similar entities in consecutive graphs or adjacent subgraphs. This base level may yield an output graph that may be updated incrementally with each new time-stamped graph.

Higher level events may be constructed as follows. The base level of the TKG may be passed through an event model to obtain a subset of nodes, which may serve as seeds for nodes at a higher level of the graph. For every node, a new higher-level node may be added. Such higher-level nodes may form a next hierarchical level of the graph. The features of such higher-level nodes may be an aggregate of their local neighborhoods at the lower level. In some embodiments, without limitation, such higher-level nodes may be connected with two types of edges: (i) hierarchy edges that connect the nodes at a level X to its neighbors at level X−1, denoting information relations across levels, and (ii) connections between the nodes themselves denoting information relations at the higher level. This process may be repeated iteratively to construct additional hierarchical levels on top of new higher-level nodes. An outcome may be the fusion of graphs from all scales or levels of the hierarchy in a single representation. This fusion may prevent the loss of information by using only a particular level and may enable creation of a richer temporal knowledge graph structure.

Updates to the TKG may come from a machine learning model—for example, LLM/VLM/MMLM/LAM, which can provide information that the knowledge graph may turn into spatial reasoning. The data for the updates may come from various types of information—for example, from a number of different sensors—including but not limited to light imaging detection and ranging (LIDAR), global positioning system (GPS), global navigation satellite system (GNSS), visual cameras, infrared cameras, depth cameras, sonic sensors, or ultrasonic sensors, among others. The models may turn this data into textual queries, for example, to the TKG. The updated data also may come from SLAM data.

TKG creation may result from a continuous stream of information, to update the TKG's entities and relations. Updating may be effected by identifying the entities in an input stream of spatial information and either merging those entities into existing entities if they are the same or nearly the same, or adding those entities to the TKG if they are different.

Creating the TKG also may come from graph neural networks (GNNs), which can be used to learn embeddings, which then can be used in subsequent similarity searches. GNNs can capture temporal relationships by incorporating time stamps or other sequence information. By learning embeddings for nodes and edges in the TKG, a GNN can handle updates to the TKG, such as updating node representations, without having to retrain the whole model. In particular, based on the learned embeddings, GNNs can measure and/or predict the likelihood of a relationship between two entities based on their embeddings and on the graph structure.

Graph Neural Networks (GNNs) may include an iterative process which propagates node states until equilibrium, followed by a neural network which produces an output for each node based on that node's state. GNNs may include Graph Convolutional Networks (GCNs) and Graph Attention Networks (GATs). GCNs can generate node-level embeddings by aggregating information from the nodes' neighborhoods. GATs may use a multi-head attention or a self-attention mechanism to obtain representation of nodes by aggregating weighted neighbor embedding.

In an embodiment, when a stream of spatial information is input, that information may be the subject of a search against the TKG, to enable extraction of a subgraph that is determined to be most similar to the input information. In an embodiment, the search may be a single hop search—for example, a path between adjacent rooms in a residence/store/office building/warehouse. In an embodiment, the search may be a two-hop search—for example, a path between two rooms in the residence/store/office building/warehouse when there is another room between them. In an embodiment, the search may be a multi-hop search—for example, a path between two rooms at opposite ends of the residence/store/office building/warehouse, when there are two or more rooms in between.

If the degree of similarity exceeds a predetermined threshold, the new entities for the input information may be merged with existing entities in the extracted subgraph in the TKG. If the degree of similarity falls below the predetermined threshold, the new entities may be added to the extracted subgraph in the TKG. Depending on the embodiment, if the degree of similarity happens to equal the predetermined threshold, the new entities may be either merged with existing entities, and/or added to existing entities.

For example, looking at a path within a house from the living room to the kitchen, spatial data may be gathered over time, to help to plan a path for a robot to traverse from the living room to the kitchen, and predict the robot's path. It may be the case that the path does not change—because, for example, there is nothing in the path to prevent the robot from moving to the kitchen from the living room along its normal learned path. The predicted path would not change. In this situation, temporal updates would show similarity above the predetermined threshold, and the new entities would be merged with the existing entities.

As another example, there may be minor changes to the path from living room to kitchen—such as a small obstacle that may be placed in the robot's planned path, but that the robot can traverse without changing its path. Here again, temporal updates may show similarity above the predetermined threshold, and the new entities would be merged with the existing entities. Relations among the entities may or may not change, depending on what the robot has to do to traverse the small obstacle. Learning effects of small obstacles on the robot's planned path can facilitate predicting what the robot should do when encountering similar obstacles.

As a further example, there may be more major changes to the path—for example, a larger obstacle which the robot cannot traverse, but can navigate around. In this situation, temporal updates may show similarity below the predetermined threshold, and the new entities, reflecting a new path, may be added to the existing entities. Relations would be added for the new entities. The existing relations may or may not change. Depending on the space around the larger obstacle, the robot may alter its path left or right to get around the larger obstacle, and then continue on its path to the kitchen. Here, too, learning the effects of larger obstacles on the robot's planned path may facilitate path planning prediction under comparable future circumstances.

As a still further example, if an obstacle completely blocks the path—for example, a closed door between the kitchen and living room—the robot may be unable to go to the kitchen because the only way in is through the door, or may have to take a completely different route to the kitchen, through one or more different rooms. Looking at the case of going through a different room to get to the kitchen, the TKG may learn and predict such a path for the robot when the robot encounters a closed door.

From the description herein, it should be understood that techniques according to various embodiments work well in dynamic environments—for example, where objects in an environment that a robot is traversing move or are moved into the robot's path, or into a path that the robot ordinarily would follow. Merely by way of example, after the last time the robot traversed the path from the living room to the kitchen, someone may have dropped a knapsack or a briefcase, or shoes, a coat or other article of clothing, pet toys, or dropped a laundry hamper into the robot's normal path. These changes would be part of a dynamic environment. In each instance, the temporal updates may show similarity above, below, or at the predetermined threshold. If above, new entities may be merged with existing entities. If below, new entities may be added to existing entities. If similarity is at the predetermined threshold, new entities may be merged with and/or added existing entities.

A yet further example may combine the circumstances from any of the examples provided herein. In different ones of the circumstances, different subgraphs over time may have similarities either above or below the predetermined threshold, resulting in different alterations of predicted path for the robot. Temporal data facilitates path planning prediction, because the temporal data yields further relationships from which predicted paths may be derived.

There are similar examples for robotic arms, or robotic vehicles with robotic arms. Vehicles may encounter obstacles in the two-dimensional planes in which they operate. Robotic arms may encounter obstacles in space which may require stopping or moving differently to get around the obstacles.

One technical advantage of the disclosed techniques relative to prior approaches is the ability to use language models (e.g., LLMs, VLMs, MMLMs, LAMs, etc.) and/or other types of machine learning models to provide text input to TKGs to train or otherwise generate or modify the TKGs so that a system (such as a vehicle or a robot) can respond appropriately to different kinds of obstacles and other conditions along a path. Consequently, the disclosed techniques address the inability of language models and/or other types of machine learning models to provide text input to TKGs to train the TKGs, the tendency of LLMs to generate text that TKGs cannot use or that cannot be used to train the TKGs, and/or other challenges encountered by conventional approaches to leveraging LLMs to train TKGs. Another technical advantage of the disclosed techniques is the ability to train, fine-tune, prompt, and/or otherwise improve the performance of language models and/or other type of machine learning models to provide text input to TKGs. Accordingly, the disclosed techniques can be used to improve capabilities of these machine learning models and/or the use of the machine learning models in applications and environments involving training of TKGs.

The above examples are not in any way intended to be limiting. As persons skilled in the art will appreciate, as a general matter, the techniques for automatically generating dialogue flows from unlabeled conversation data can be implemented in any suitable application.

The systems and methods described herein may be used for a variety of purposes, by way of example and without limitation, for use in systems associated with machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, generative AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an infotainment or plug-in gaming/streaming system of an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models—such as LLMs that may process text, audio, and/or image data, systems for performing light transport simulation, systems for performing collaborative content creation for 3D assets, systems implemented at least partially using cloud computing resources, systems for performing generative AI operations, and/or other types of systems.

In some embodiments, the systems and methods described herein may be performed within a simulation environment (e.g., NVIDIA's DriveSIM, NVIDIA's ISAAC GYM, NVIDIA's ISAAC SIM, etc.) using simulated data (e.g., simulated sensor data of simulated sensors of a virtual or simulated machine). For example, simulated sensor data may be used (e.g., processed using one or more machine learning models, neural networks, etc.) to identify, detect, and/or classify lane lines, road boundary lines, other lines, vertical structures/features, etc. within the simulation environment using points of a curve and/or one or more curve fitting algorithms, and may use this information to perform operations (e.g., control, navigation, planning, etc. operations) associated with the virtual machine within the environment. These simulated operations may be used to test performance of the underlying algorithms, systems, and/or processes prior to deploying them in the real-world. In some instances, the simulation may be used to generate synthetic training data—e.g., training data including regions of interest and/or sub-regions of interest from within the simulation. In some embodiments, other methods may be used in addition or alternatively from a simulation to generate synthetic training data. For example, the synthetic training data may be generated using neural radiance fields (NeRFs), Gaussian splat techniques, diffusion models, electrostatic models (e.g., Poisson flow generative models (PFGMs), etc. The synthetic training data (in addition to or alternatively from real-world data) may then be processed to determine geometry, curvature, semantic information, classification information, and/or other information related to features of interest, such as lines, longitudinal features (e.g., poles), and/or other features within a driving environment, a warehouse, etc., for example. In any example, such as where a simulation environment is used for testing, validation, training, etc., the simulation environment and/or associated training data may be rendered or otherwise generated using one or more light transport algorithms—such as ray-tracing and/or path-tracing algorithms. In some embodiments, the simulation environment and/or one or more objects, features, or components thereof may be generated or managed within a three-dimensional (3D) content collaboration platform (e.g., NVIDIA's OMNIVERSE) for industrial digitalization, generative physical AI, and/or other use cases, applications, or services. For example, the content collaboration platform or system may include a system that uses universal scene descriptor (USD) (e.g., OpenUSD) data for managing objects, features, scenes, etc. within a simulated environment, digital environment, etc. The platform may include real physics simulation, such as using NVIDIA's PhysX SDK, in order to simulate real physics and physical interactions with simulations hosted by the platform. The platform may integrate OpenUSD along with ray tracing/path tracing/light transport simulation (e.g., NVIDIA's RTX rendering technologies) into software tools and simulation workflows for building, training, deploying, or testing AI systems—such as systems for testing, validating, training (e.g., machine learning models, neural networks, etc.), and/or other tasks related to automotive, robot, machine, or other applications.

In some embodiments, teleoperation or remote control of a vehicle or other machine may be performed using a remote control or teleoperation system. For example, the systems and methods described herein may be used to identify lane lines, road boundary lines, longitudinal features, etc. that may be included in a visualization or mapping of an environment to aid a remote operator in controlling—or providing waypoints or other indications of control or navigation—an autonomous or semi-autonomous machine through an environment.

In some embodiments, the system and methods described herein may be deployed in a robotics application. For example, a robot or robotic system may include one or more onboard processors (e.g., CPUs, GPUs, hardware-based deep learning accelerators (DLAs), hardware-based programmable vision accelerators (PVAs)—which may include one or more vector processing units (VPUs), direct memory access (DMA) systems, and/or pixel processing engines (PPEs), hardware-based optical flow accelerators (OFAs), SoCs, etc.) and memory and/or storage (e.g., for storing control algorithms, sensor data, and one or more machine learning models). The robotic system may use these processors to execute one or more machine learning models (e.g., language models) that allow it to perform complex tasks autonomously or semi-autonomously, such as interacting with and/or manipulating static and/or dynamic objects, or navigating environments using sensors such as cameras, LiDAR, RADAR, ultrasonic sensors, and more. The system may use sensor fusion techniques to combine data from multiple sensors (e.g., cameras, infrared, LiDAR, RADAR, accelerometers) to create a comprehensive model of the robot's surroundings. This data may be processed locally on the robot or sent to remote servers for more computationally intensive tasks, such as 3D mapping or SLAM (Simultaneous Localization and Mapping). In one or more embodiments, data from individual robots (e.g., sensor data, task status, or environmental conditions) may be uploaded to the cloud, where centralized AI models can analyze and distribute optimized commands to an entire fleet. In some embodiments, the machine learning model(s) (e.g., language models, VLMs, LLMs, MMLMs, diffusion models, NeRF models, DNNs, etc.) described herein may be used to allow the robot to perceive and reason about the environment and/or communicate with one or more other robots and/or persons in an environment. In some embodiments, the robot may communicate (e.g., using one or more network interface cards (NICs) and/or data processing units (DPUs)) with one or more locally hosted servers/computing devices and/or with one or more remotely located servers/computing devices (e.g., in one or more data centers).

In some embodiments, one or more transformer engines (TEs) may be implemented. The transformer engine may use micro-tensor scaling to optimize performance and accuracy—such as to enable 16-bit floating point (FP16), 8-bit floating point (FP8), and/or 4-bit floating point (FP4) artificial intelligence processing. For example, the transformer engine may use 16-bit or 8-bit floating point precision and an 8-bit or 4-bit floating point data format combined with software algorithms for increasing AI performance and capabilities. By reducing math operations to 8-bits or 4-bits, the TE allows for training larger networks faster without compromising accuracy. For example, the TEs may include a library for accelerating transformer models on processing devices—such as GPUs—to provide better performance with lower memory utilization in both training and inference. When the TE is combined with other technologies, such as high-speed interconnects between nodes (e.g., using NVLink Switch) and tensor cores (which enable mixed-precision computing, such as microscaling precision support), server clusters may be more capable of training enormous networks at high speeds. As such, tensor core precisions of FP64, TF32, BF16, FP16, FP8, INT8, FP6, and FP4 may be supported, as well as CUDA core precisions of FP64, FP32, FP16, and BF16.

System Overview

FIG. 1 is a block diagram illustrating a computing system 100 configured to implement one or more aspects of at least one embodiment. In at least one embodiment, computing system 100 may include any type of computing device, including, without limitation, a server machine, a server platform, a desktop machine, a laptop machine, a hand-held/mobile device, a digital kiosk, an in-vehicle infotainment system, a smart speaker or display, a television, and/or a wearable device. In at least one embodiment, computing system 100 is a server machine operating in a data center or a cloud computing environment that provides scalable computing resources as a service over a network.

It is noted that the computing device described herein is illustrative and that any other technically feasible configurations fall within the scope of the present disclosure. For example, multiple instances of data-generation engine 122, and training engine 124, and path planning prediction engine 126 could execute on a set of nodes in a distributed and/or cloud computing system to implement the functionality of computing device 100. In another example, data-generation engine 122 and training engine 124 could execute on various sets of hardware, types of devices, or environments to adapt data-generation engine 122 or training engine 124 to different use cases or applications. In a third example, data-generation engine 122 and training engine 124 could execute on different computing devices and/or different sets of computing devices.

In one embodiment, computing device 100 may include, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 may be configured to couple computing device 100 to a network 110.

Network 110 may be any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 may include non-volatile storage for applications and data, and may include fixed or removable disk drives, flash memory devices, and CD-ROM, DVD-ROM, Blu-Ray, HD-DVD, or other magnetic, optical, or solid-state storage devices. Data-generation engine 122, training engine 124, and path planning prediction engine 126 may be stored in storage 114 and loaded into memory 116 when executed.

Memory 116 may include a random-access memory (RAM) module, a flash memory unit, or any other type of memory unit or combination thereof. Processor(s) 102, I/O device interface 104, and network interface 106 may be configured to read data from and write data to memory 116. Memory 116 may include various software programs that can be executed by processor(s) 102 and application data associated with said software programs, including data-generation engine 122, training engine 124, and path planning prediction engine 126.

In some embodiments, training engine 124 and path planning prediction engine 126 include functionality to train and/or update a TKG to predict a next action or movement for an autonomous mobile robot (AMR) and/or another type of machine (collectively referred to as "robotic system" or "robotic machine." The TKG may directly map inputs such as (but not limited to) camera images, velocities, global guidance, and/or robot states to multi-modal outputs such as (but not limited to) semantic segmentations, paths, and/or navigation commands. These multi-modal outputs can then be used to perform navigation for the machine, generate predictions of future states associated with the machine, simulate operation of the machine, and/or perform other tasks related to the machine. Training engine 124 and path planning prediction engine 126 are described in further detail herein with respect to FIG. 2.

In some embodiments, as described herein data-generation engine 122 may generate a simulated dataset or other synthetic dataset for the purpose of training, evaluating, and/or testing the TKG, other types of machine learning models that can be used by AMRs and/or other machine types to perform tasks, hardware configurations for the machines, and/or other components of the machines. The dataset used to train the TKG need not be synthetic, depending on the environment, although there may be circumstances regarding a planned path for an AMR and/or other machine type that are sufficiently difficult to discern using actual training data that synthetic or simulated training data may be used. As discussed herein, data-generation engine 122 may be configured and/or customized via various parameters to generate data that captures different scenarios related to navigation and/or other types of tasks performed by machines in environments. Data-generation engine 122 is described in further detail herein with respect to FIG. 2.

Figure 2:
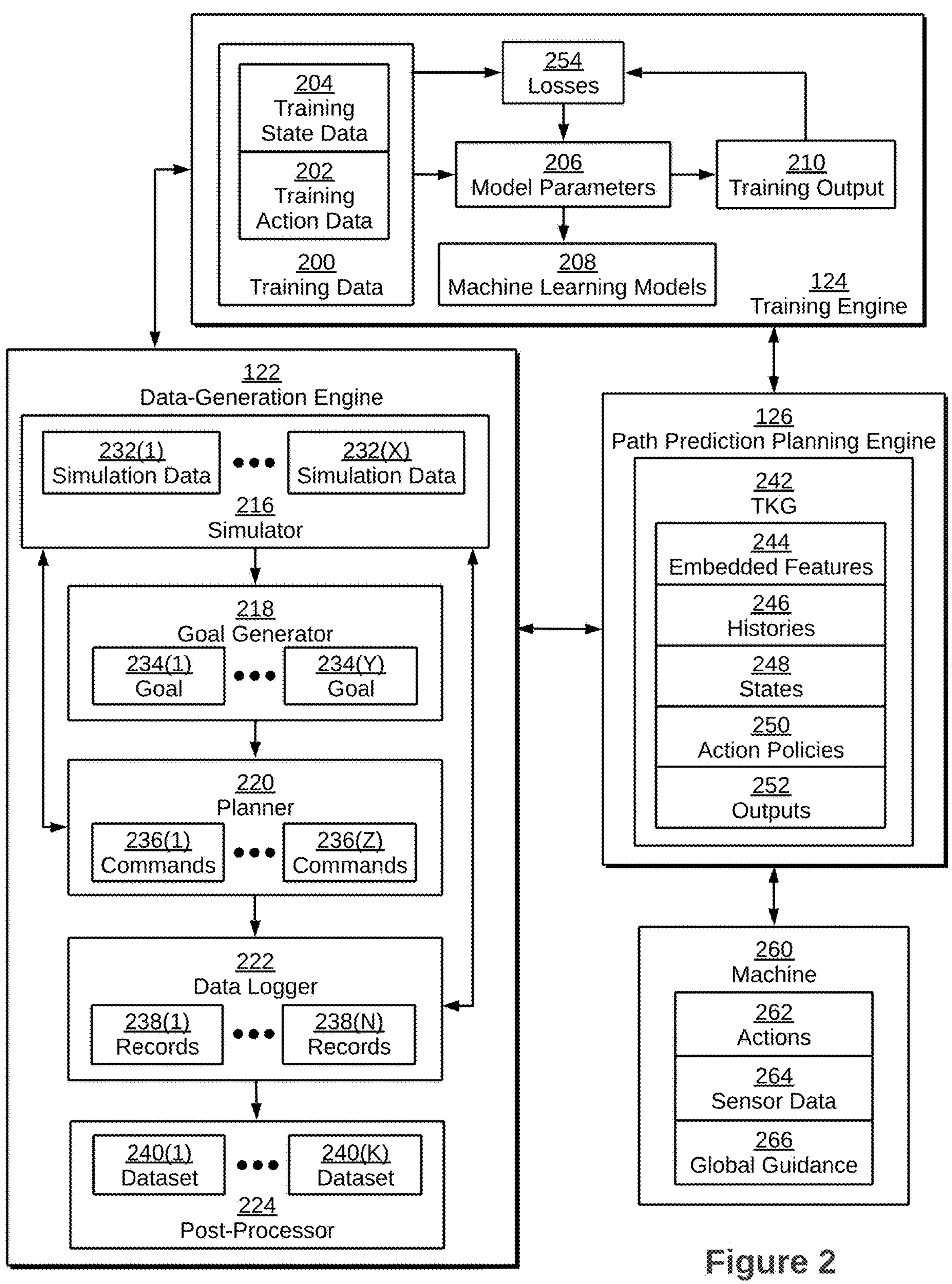
FIG. 2 is a more detailed illustration of the data-generation engine, training engine, and execution engine of FIG. 1, according to various embodiments.

FIG. 2 illustrates a system for spatial and path planning using knowledge graphs that includes data-generation engine 122, training engine 124, and path planning prediction engine 126 of FIG. 1, according to various embodiments. As discussed herein, training engine 124 trains temporal knowledge graph 242. Using inputs from path planning prediction engine 126, reflecting an environment at a given time step, training engine 124 also may update temporal knowledge graph 242. Path prediction engine 126 also may update temporal knowledge graph 242.

As discussed herein, data-generation engine 122 may generate simulation data that can be used to train, evaluate, test, and/or otherwise operate one or more of machine learning models 208 in training engine 124, or other types of machine learning models that can be used by AMRs and/or other machine types to perform tasks, hardware configurations for the machines, and/or other components of the machines.

Data-generation engine 122 may include a simulator 216 that generates multiple sets of simulation data 232(1)-232(X) (each of which is referred to individually herein as simulation data 232). For example, simulator 216 may perform physics or other simulations of various environments around an AMR and/or another type of machine. During these simulations, simulator 216 may generate simulation data 232 that may include (but is not limited to) rendered images of the environment around the machine (e.g., from the perspective of one or more cameras on the machine and/or a birds-eye visualization), semantic labels (e.g., segmentation maps, detected objects, bounding shapes, etc.) associated with the images, a state of the machine (e.g., position, heading, velocity, etc.), and/or an occupancy map of free and/or occupied space within the environment.

Data-generation engine 122 may include a goal generator 218 that determines a set of goals 234(1)-234(Y) (each of which is referred to individually herein as goal 234) associated with simulation data 232. For example, goal generator 218 may generate, within a given occupancy map outputted by simulator 216, a target location to navigate to within a corresponding environment.

Data-generation engine 122 may include a planner 220 that generates various commands 236(1)-236(Z) that cause the machine to take one or more corresponding actions based on simulation data 232 and/or goals 234. For example, planner 220 may generate commands 236 that include (but are not limited to) a linear and/or angular velocity that move the machine toward a certain goal 234 from goal generator 218 while avoiding obstacles in an environment represented by simulation data 232 from simulator 216.

Each set of commands 236 outputted by planner 220 may be sent to simulator 216, which may update the state of the machine, rendered images, semantic labels, occupancy map, and/or other simulation data 232 based on the action. Simulator 216 may then send some or all of the updated simulation data 232 to planner 220 to allow planner 220 to generate a new set of commands 236 based on the updated simulation data 232 and the corresponding goal 234 from goal generator 218. This process may repeat until goal 234 is reached, a certain number of time steps has been executed within a given simulation, and/or another condition indicating the end of the simulation is met.

Data-generation engine 122 further may include a data logger 222 that aggregates simulation data 232, goals 234, commands 236, and/or other data generated by simulator 216, goal generator 218, and planner 220 into multiple records 238(1)-238(N) (each of which is referred to individually herein as record 238). For example, data logger 222 may log, in records 238, data from simulator 216, goal generator 218, and/or planner 220 in the order in which the corresponding events occur (e.g., in time steps, "frames" of simulation data 232, and/or other discrete representations of time) within the corresponding simulations. Data logger 222 may also, or instead, downsample and/or resample some or all of the data (e.g., on a spatial and/or temporal basis) in records 238 to reduce and/or modify the size of the logged data.

A post-processor 224 in data-generation engine 122 may adapt simulation data 232, goals 234, commands 236, records 238, and/or other data generated by the other components of data-generation engine 122 to various machine learning models and/or use cases. For example, post-processor 224 may resample, compress, format, and/or otherwise convert data in a given set of records 238 into a form that can be used to train and/or evaluate a machine learning model in training engine 124, a TKG 242 in path planning prediction engine 126, hardware configuration, and/or other components of one or more machines. Each set of records 238 that is post-processed for a given purpose and/or in a certain way may be stored in one or more datasets 240(1)-240(K) (each of which is referred to individually herein as dataset 240) for subsequent retrieval and use.

In some embodiments, data-generation engine 122 is configured and/or customized via different types of configuration parameters. For example, the configuration parameters may include a unique name and/or identifier for a given scenario (e.g., a combination of a particular environment, machine, goal, policy, etc.) under which data is to be generated and collected. The configuration parameters may also be used to customize the environment and/or type of machine to be simulated, the goal, the type of planner, the type of data to log, the frequency with which the data is logged, and/or the way in which the logged data is converted into a format that is suitable for training and/or evaluating a machine learning model, a TKG, and/or another component of the machine. Different sets of configuration parameters can be used to launch different instances of the data-generation pipeline (e.g., in parallel on multiple nodes of a distributed system) to generate data that captures different scenarios related to navigation and/or other types of tasks performed by machines in environments.

Training engine 124 may train one or more machine learning models 208 using training data 200 that is derived from one or more datasets 240 generated by data-generation engine 122, data collected by machines in real-world environments, simulation using, for example, the simulator 216, and/or other data sources. As shown in FIG. 2, training data 200 may include training state data 204 representing states associated with machines and/or environments. For example, training state data 204 may include sensor data (e.g., images, LiDAR, RADAR, audio data, ultrasonic data, inertial measurement unit (IMU) data, etc.) captured by virtual and/or real sensors on the machines, representations of environments around the machines (e.g., visualizations, semantic segmentations, point clouds, meshes, environment types, environment descriptions, scene description using Universal Scene Descriptor (USD) data (e.g., OpenUSD), etc.), linear and/or angular velocities of the machines, machine types and/or machine models associated with the machines, global guidance associated with navigation and/or other tasks or goals 234 of the machines, and/or other information that can be used to characterize the states of the machines and/or environments around the machines. In the context of a TKG, as discussed herein, there may be a temporal aspect to the collected data, such that one or more of machine learning models 208 may output not only spatial data but also temporal data as inputs to the TKG.

Training data 200 also may include training action data 202 representing actions to be performed by machines in environments. For example, training action data 202 may include "ground truth" actions, "teacher" action policies, commands, routes, trajectories, paths, and/or other indications of actions to be performed during perception, planning, control, prediction, navigation, manipulation, and/or other tasks using the machines. In some embodiments, training action data 202 may include synthetic data—for example, in circumstances in which an obstacle along a planned route or path for a machine may not be as readily identifiable from actual data, and training data may provide a more ready determination of subgraph similarity. In some embodiments, synthetic data may include simulation data to describe or otherwise identify conditions, such as but not limited to obstacles, along a planned route or path for a machine.

In some embodiments, machine learning models 208 may be used to perform and/or guide tasks using the machines. For example, machine learning models 208 may include tree-based models such as decision trees, random forests, and gradient-boosted trees; feedforward neural networks, convolutional neural networks (CNNs), recurrent neural networks (RNNs), residual neural networks, long short-term memory networks (LSTMs), graph neural networks, transformer neural networks, diffusion models, generative adversarial networks (GANs), language models (large language models (LLMs), vision language models (VLMs), multimodal language models (MMLMs), etc.), neural radiance field (NeRF) models, gaussian splat models, and/or other types of neural networks; and/or support vector machines (SVMs), logistic regression models, hierarchical models, ensemble models, Bayesian networks, naïve Bayes classifiers, and/or other types of model architectures. Machine learning models 208 may also, or instead, include rules, filters, heuristics, logic programming, semantic nets, search techniques, named entity recognition techniques, and/or other symbolic models. Each machine learning model may be used to generate embeddings, semantic segmentations, reconstructions and/or predictions of sensor data, classification output, safety alerts, trajectories, commands, and/or other output related to one or more corresponding tasks.

During training of machine learning models 208, training engine 124 may input some or all training state data 204 into machine learning models 208. Training engine 124 may use model parameters 206—for example, neural network weights—of machine learning models 208 to process the inputted training state data 204, and may obtain training output 210 that may include predictions associated with training state data 204 from one or more layers, blocks, or components of machine learning models 208. Training engine 124 may compute one or more losses 254 using training output 210, training state data 204, and/or training action data 202. Training engine 124 then may use a training technique (e.g., gradient descent and backpropagation) to iteratively update model parameters 206 of machine learning models 208 in a way that reduces losses 254.

In one or more embodiments, path planning prediction engine 126 uses one, some, or all trained machine learning models 208 to train a TKG 242 that can be used to perform end-to-end navigation and/or other tasks for a machine 260 in a real-world, simulated, digital twin, and/or another type of environment. For example, machine 260 may include a quadruped robot, a humanoid robot, a differential drive system, an Ackermann drive system, a warehouse robot, a delivery robot, a forklift, and/or another type of AMR. Machine 260 may also, or instead, include an autonomous or semi-autonomous vehicle, drone, submarine, watercraft, and/or another type of vehicle with navigation capabilities. TKG 242 may be deployed for real-time inference on machine 260 using a runtime platform (e.g., NVIDIA's TensorRT) that accelerates and optimizes performance using quantization, layer and tension fusion, kernel tuning, GPU-based execution, streaming audio and/or video, and/or concurrent execution.

TKG 242 may operate on inputs such as (but not limited to) sensor data 264 from machine 260 (e.g., camera images, LiDAR data, RADAR data, audio data, velocities, states, etc.), global guidance 266 associated with the tasks (e.g., paths, trajectories, routes, destinations, etc.), and/or other representations of machine 260 and/or the environment around machine 260. Given these inputs, TKG 242 may include embedded features 244 which relate to the environment. TKG 242 also may include histories 246 which may describe one or more prior paths that the machine 260 has traversed, and also may include identification of obstacles that machine 260 encountered while traversing the one or more prior paths. TKG 242 also may include states 248 of the machine as a function of the entities and relations in TKG 242. TKG 242 also may include action policies 250 for actions of machine 260 in its environment. TKG 242 may generate outputs 252 for actions 262 that machine 260 is to take. Embedded features 244, histories 246, states 248, action policies 250, and/or outputs 252 generated by TKG 242 may additionally be used to determine one or more actions 262 to be carried out by machine 260 during execution of the tasks.

Figure 3A:
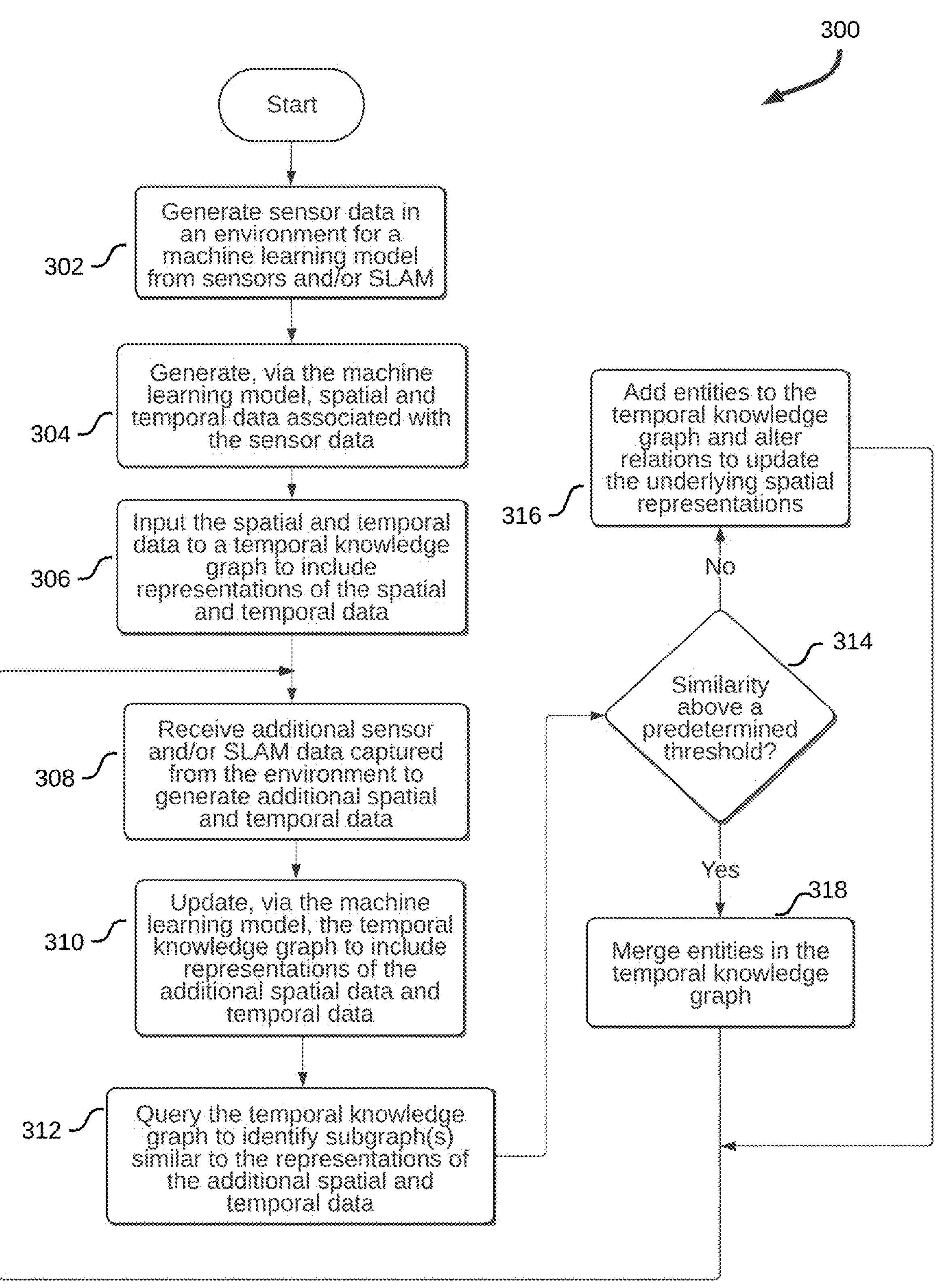
FIG. 3A illustrates a flow diagram of a method for generating and updating a temporal knowledge graph, according to various embodiments.
Figure 3B:
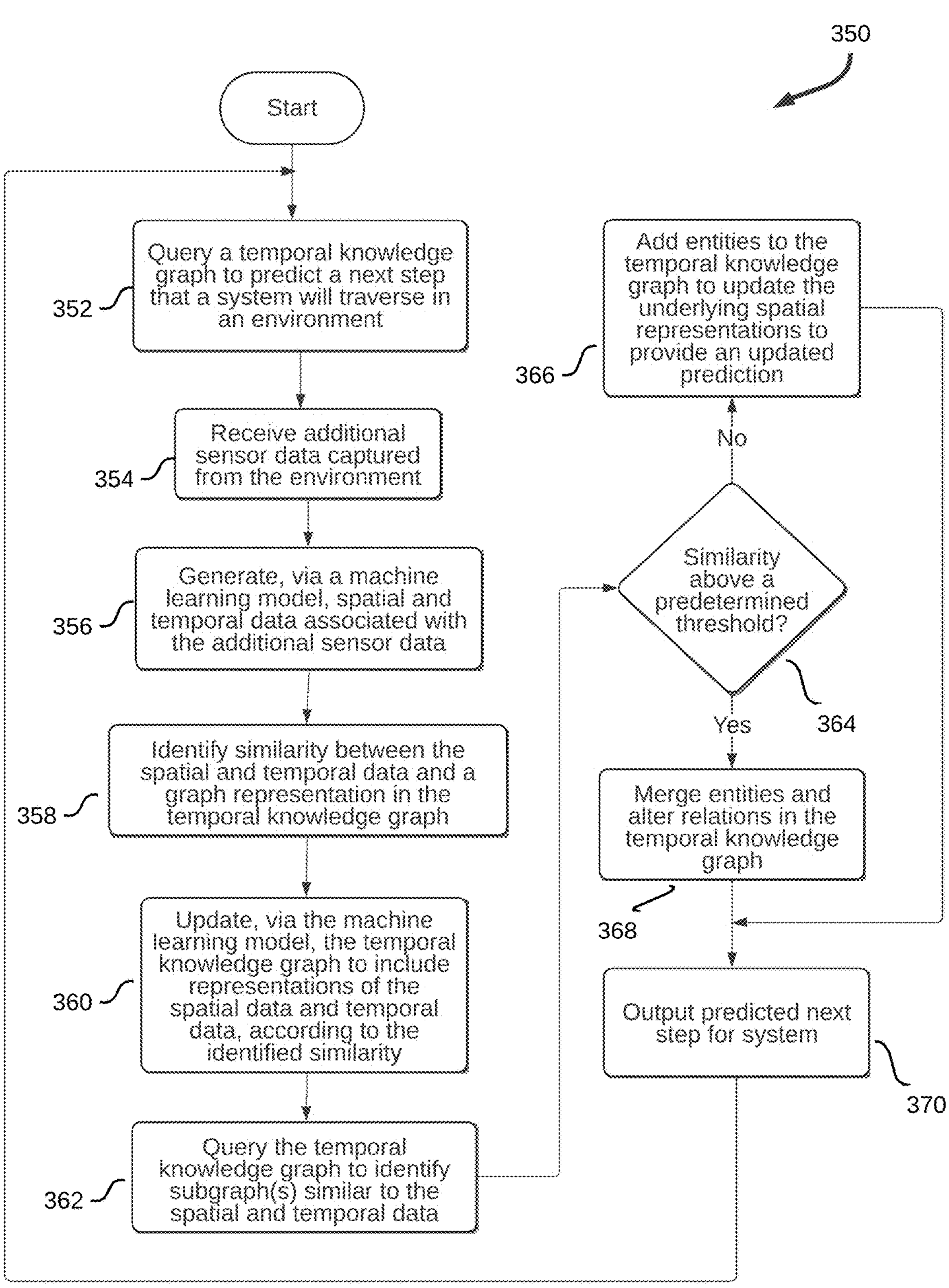
FIG. 3B illustrates a flow diagram of a method for predicting a next step in a path using a temporal knowledge graph, according to various embodiments.

Now referring to FIGS. 3A and 3B, each block of methods 300 and 350, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 300 and 350 are described, by way of example, with respect to the systems of FIGS. 1-2. However, these methods may additionally or alternatively be executed by any one system, or any combination of systems, including, but not limited to, those described herein. Further, the operations in methods 300 and 350 may be omitted, repeated, and/or performed in any order without departing from the scope of the present disclosure.

FIG. 3A illustrates a flow diagram of a method 300 for generating and updating a TKG according to various embodiments, performing spatial mapping and planning using machine learning models.

As shown in FIG. 3A, method 300 to train and/or update a TKG begins with operation 302, in which sensor data, comprising data from one or more of the sensors discussed herein and/or SLAM data, may be generated within an environment in which machine 260 is to operate. At operation 304, one or more of trained machine learning models 208 may generate spatial and temporal data associated with the generated sensor data. At operation 306, the spatial and temporal data may be input to TKG 242. According to embodiments, machine learning model(s) 208 may input this spatial and temporal data to TKG 242 as textual data to train the TKG 242. At operation 308, at a different time step, the one or more trained machine learning models 208 may receive additional generated sensor data, and may generate additional spatial and temporal data. At operation 310, the one or more machine learning models 208 may update TKG 242 to include representations of the additional spatial and temporal data.

At operation 312, the TKG 242 may be queried to identify one or more subgraphs (graph representations) of the TKG 242 having similarity to the spatial and temporal data input to the TKG 242 via learning model(s) 208. A degree of similarity may be identified, and in operation 314, may be compared to a threshold. The threshold may be set according to a number of different conditions and/or circumstances which may relate to the environment in which the machine is operating. The less challenging the environment (as denoted by the subgraph, for example), the lower the threshold may be. Depending on the embodiment, the more challenging the environment, the higher the threshold may be. For example, the environment in which the machine is operating may have some areas which may be easier to traverse (implying a lower acceptable threshold of similarity), and/or some areas which are more difficult to traverse (implying a higher acceptable threshold of similarity). As a further example, some areas may have relatively straight paths, with few or no obstacles (implying a lower acceptable threshold of similarity), or winding or other multi-directional paths, with or without obstacles (implying a higher acceptable threshold of similarity). The complexity of the path, and/or the number of obstacles, and/or the size of the obstacles, can affect the level of acceptable threshold of similarity.

In operation 314, a determination is made whether the similarity discussed herein is above a predetermined threshold. If it is not, meaning that one or more subgraph(s) are not sufficiently similar to the spatial and temporal data input to the TKG 242, then in operation 316 the TKG 242 may be updated to add entities and alter any corresponding relations.

If the similarity discussed herein is above the predetermined threshold, meaning that one or more subgraph(s) are sufficiently similar to the spatial and temporal data input to the TKG 242, then in operation 318 the entities may be merged into TKG 242. Then, depending on the state of traversal of the machine, the operation may return to operation 308 for one or more next time steps, and operations 308 to 318 may be repeated. If the machine has completed its traversal, the operations may end until the machine's next traversal.

FIG. 3B depicts a method 350 for predicting a next step for a system to traverse in an environment. At operation 352, a TKG may be queried to provide a prediction for the next step. At operation 354, additional sensor data may be captured from the environment. At operation 356, the machine learning model(s) may generate spatial and temporal data associated with the additional sensor data. At operation 358, a similarity between that spatial and temporal data and a graph representation in the TKG may be identified.

At operation 360, the machine learning model(s) may update the TKG to include representations of the spatial and temporal data, according to the identified similarity. At operation 362, the TKG may be queried to identify one or more subgraphs having a similarity to the representations of the spatial and temporal data. At operation 364, the similarity may be compared to a predetermined threshold. In some embodiments, this comparison may be similar to the process described in FIG. 3A. If the similarity is not above the predetermined threshold, then at operation 366 entities may be added to the TKG, and relations may be altered to update the underlying spatial representations, and provide an updated prediction for a next step. If the similarity is above the predetermined threshold, then at operation 368 the entities may be merged in the TKG. At operation 370, a predicted next step may be output. The next step may be the same as the one predicted in operation 352, if the identified similarity is above the predetermined threshold. The next step may be updated or altered from the one predicted in operation 352, if the identified similarity is not above the predetermined threshold.

Then, depending on where in its traversal the system is, operation may return to operation 352 for a further predicted next step, and operations 352-370 may be repeated. If the system has completed its traversal, the operation may end.

In sum, the disclosed techniques enable a path planning system to augment a general purpose reasoning model with a TKG, which can handle spatial information well by virtue of its entities and relations as discussed herein. Temporal updates to the TKG as discussed herein may reflect the TKG's current spatial understanding of an environment. An updated TKG may provide a robot, vehicle, or other machine with predictive path information. The predictive path information may be to traverse a path between two locations in a house, office building or warehouse, or may be for a robotic arm or other implement attached to a stationary or moving machine to traverse a path to perform a particular operation.

To generate a predictive path input to a TKG, a prompt may be inputted from an LLM (or another type of machine learning model) to the TKG. The prompt may include an instruction for performing a particular motion or action and a set of spatial and temporal data, one or more example ground-truth solutions for the spatial and temporal data, and a set of example solutions corresponding to the example ground-truth solution(s) as part of training for the TKG. The prompt also may include a particular path planning prediction and a ground-truth solution for the predicted path. The LLM may generate one or more textual inputs to the TKG using the prompt.

If a predicted path is correct, includes code that executes, and/or meets other criteria, the textual data for the prediction may be added to a path planning prediction dataset. The process may be repeated with additional predicted paths to populate the path planning prediction dataset. The path planning prediction dataset may then be used to fine-tune an LLM (or another type of machine learning model), evaluate the performance of an LLM and/or another type of machine learning model, and/or otherwise guide an LLM on path planning prediction tasks. Ultimately, the LLM will provide a textual input to a TKG, so that the TKG can provide the next predicted step along a path.

One technical advantage of the disclosed techniques relative to prior approaches is the ability to use LLMs (or other types of machine learning models) to provide textual input to TKGs to train TKGs and/or to enable TKGs to predict a next step for a robot. Consequently, the disclosed techniques address the inability of LLMs to provide such textual input to TKGs, the inability of TKGs to accept such textual input from LLMs, and/or other challenges encountered by conventional approaches to leveraging LLMs to train TKGs. Another technical advantage of the disclosed techniques is the ability to train, fine-tune, prompt, and/or otherwise improve the performance of LLMs and/or other type of machine learning models spatial and/or path planning tasks. Accordingly, the disclosed techniques can be used to improve the spatial and/or path planning capabilities of these machine learning models and/or the use of the machine learning models in applications and environments involving spatial and/or path planning.

Inference and Training Logic

Figure 4A:
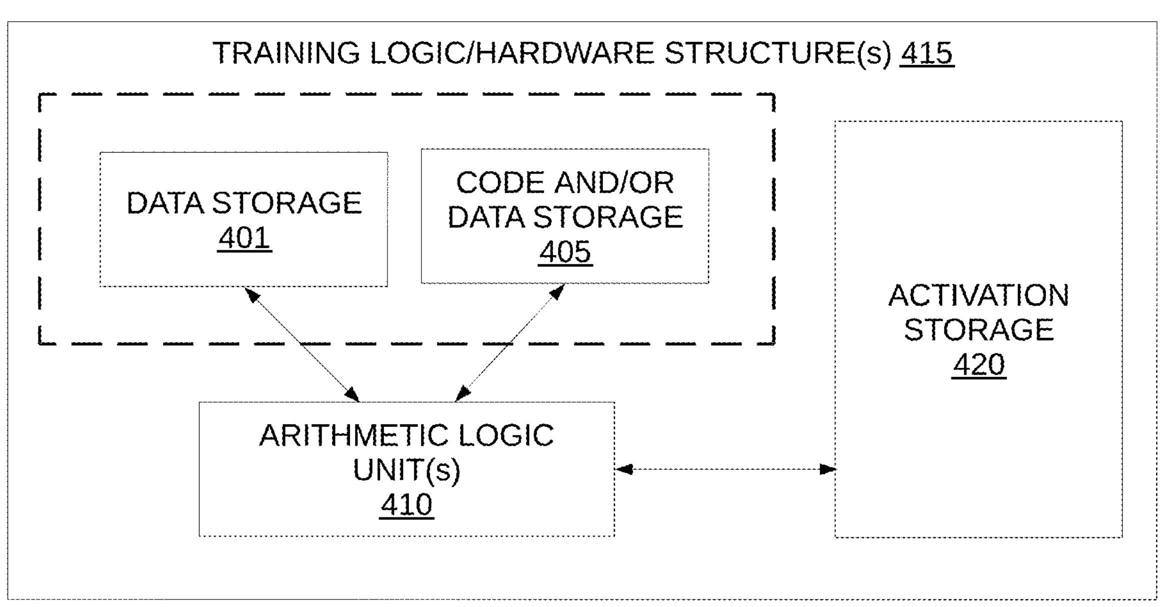
FIG. 4A illustrates inference and/or training logic, according to various embodiments.

FIG. 4A illustrates inference and/or training logic 415 used to perform inferencing and/or training operations associated with one or more embodiments. Details regarding inference and/or training logic 415 are provided herein in conjunction with at least FIGS. 4A and/or 4B.

In at least one embodiment, inference and/or training logic 415 may include, without limitation, code and/or data storage 401 to store forward and/or output weight and/or input/output data, and/or other parameters to configure neurons or layers of a neural network trained and/or used for inferencing in aspects of one or more embodiments. In at least one embodiment, training logic 415 may include, or be coupled to code and/or data storage 401 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which such code corresponds. In at least one embodiment, code and/or data storage 401 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 401 may be included with other on-chip or off-chip data storage, including a processor's L1, L2, or L3 cache or system memory.

In at least one embodiment, any portion of code and/or data storage 401 may be internal or external to one or more processors or other hardware logic devices or circuits. In at least one embodiment, code and/or code and/or data storage 401 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 401 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 415 may include, without limitation, a code and/or data storage 405 to store backward and/or output weight and/or input/output data corresponding to neurons or layers of a neural network trained and/or used for inferencing in aspects of one or more embodiments. In at least one embodiment, code and/or data storage 405 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 415 may include, or be coupled to code and/or data storage 405 to store graph code or other software to control timing and/or order, in which weight and/or other parameter information is to be loaded to configure, logic, including integer and/or floating point units (collectively, arithmetic logic units (ALUs)).

In at least one embodiment, code, such as graph code, causes the loading of weight or other parameter information into processor ALUs based on an architecture of a neural network to which such code corresponds. In at least one embodiment, any portion of code and/or data storage 405 may be included with other on-chip or off-chip data storage, including a processor's L1, L2, or L3 cache or system memory. In at least one embodiment, any portion of code and/or data storage 405 may be internal or external to one or more processors or other hardware logic devices or circuits. In at least one embodiment, code and/or data storage 405 may be cache memory, DRAM, SRAM, non-volatile memory (e.g., flash memory), or other storage. In at least one embodiment, a choice of whether code and/or data storage 405 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 401 and code and/or data storage 405 may be separate storage structures. In at least one embodiment, code and/or data storage 401 and code and/or data storage 405 may be a combined storage structure. In at least one embodiment, code and/or data storage 401 and code and/or data storage 405 may be partially combined and partially separate. In at least one embodiment, any portion of code and/or data storage 401 and code and/or data storage 405 may be included with other on-chip or off-chip data storage, including a processor's L1, L2, or L3 cache or system memory.

In at least one embodiment, inference and/or training logic 415 may include, without limitation, one or more arithmetic logic unit(s) ("ALU(s)") 410, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 420 that are functions of input/output and/or weight parameter data stored in code and/or data storage 401 and/or code and/or data storage 405. In at least one embodiment, activations stored in activation storage 420 are generated according to linear algebraic and or matrix-based mathematics performed by ALU(s) 410 in response to performing instructions or other code, wherein weight values stored in code and/or data storage 405 and/or data storage 401 are used as operands along with other values, such as bias values, gradient information, momentum values, or other parameters or hyperparameters, any or all of which may be stored in code and/or data storage 405 or code and/or data storage 401 or another storage on or off-chip.

In at least one embodiment, ALU(s) 410 are included within one or more processors or other hardware logic devices or circuits, whereas in another embodiment, ALU(s) 410 may be external to a processor or other hardware logic device or circuit that uses them (e.g., a co-processor). In at least one embodiment, ALUs 410 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 401, code and/or data storage 405, and activation storage 420 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 420 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 420 may be cache memory, DRAM, SRAM, non-volatile memory (e.g., flash memory), or other storage. In at least one embodiment, activation storage 420 may be completely or partially within or external to one or more processors or other logical circuits. In at least one embodiment, a choice of whether activation storage 420 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 415 illustrated in FIG. 4A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 415 illustrated in FIG. 4A may be used in conjunction with central processing unit ("CPU") hardware, graphics processing unit ("GPU") hardware or other hardware, such as field programmable gate arrays ("FPGAs").

Figure 4B:
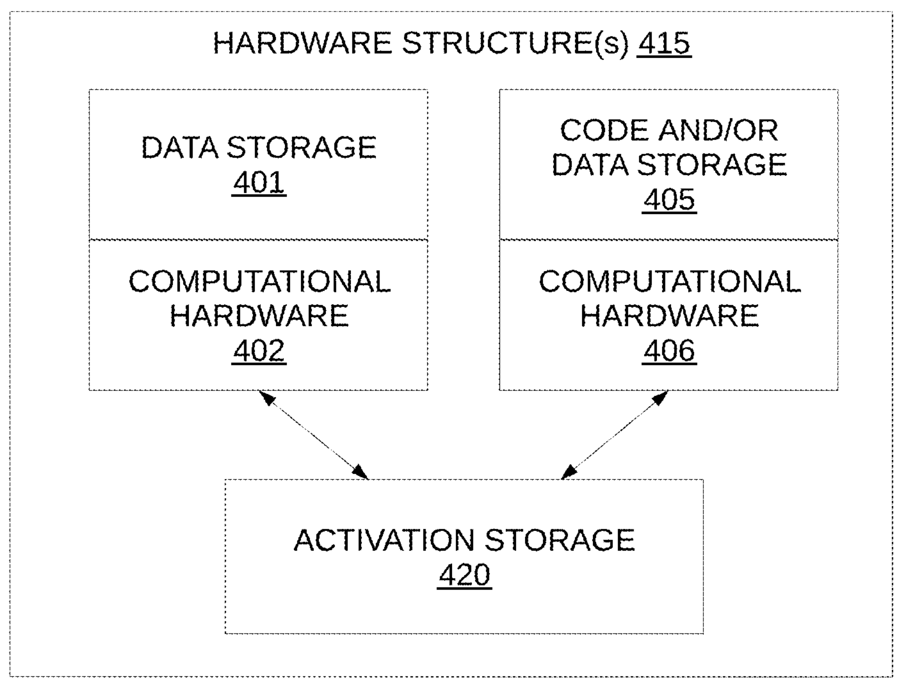
FIG. 4B illustrates inference and/or training logic, according to various embodiments.

FIG. 4B illustrates inference and/or training logic 415, according to at least one embodiment. In at least one embodiment, inference and/or training logic 415 may include, without limitation, hardware logic in which computational resources are dedicated or otherwise exclusively used in conjunction with weight values or other information corresponding to one or more layers of neurons within a neural network. In at least one embodiment, inference and/or training logic 415 illustrated in FIG. 4B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 415 illustrated in FIG. 4B may be used in conjunction with central processing unit (CPU) hardware, graphics processing unit (GPU) hardware or other hardware, such as field programmable gate arrays (FPGAs). In at least one embodiment, inference and/or training logic 415 includes, without limitation, code and/or data storage 401 and code and/or data storage 405, which may be used to store code (e.g., graph code), weight values and/or other information, including bias values, gradient information, momentum values, and/or other parameter or hyperparameter information. In at least one embodiment illustrated in FIG. 4B, each of code and/or data storage 401 and code and/or data storage 405 is associated with a dedicated computational resource, such as computational hardware 402 and computational hardware 406, respectively. In at least one embodiment, each of computational hardware 402 and computational hardware 406 comprises one or more ALUs that perform mathematical functions, such as linear algebraic functions, only on information stored in code and/or data storage 401 and code and/or data storage 405, respectively, result of which is stored in activation storage 420.

In at least one embodiment, each of code and/or data storage 401 and 405 and corresponding computational hardware 402 and 406, respectively, correspond to different layers of a neural network, such that resulting activation from one storage/computational pair 401/402 of code and/or data storage 401 and computational hardware 402 is provided as an input to a next storage/computational pair 405/406 of code and/or data storage 405 and computational hardware 406, in order to mirror a conceptual organization of a neural network. In at least one embodiment, each of storage/computational pairs 401/402 and 405/406 may correspond to more than one neural network layer. In at least one embodiment, additional storage/computation pairs (not shown) subsequent to or in parallel with storage/computation pairs 401/402 and 405/406 may be included in inference and/or training logic 415.

Neural Network Training and Deployment

Figure 5:
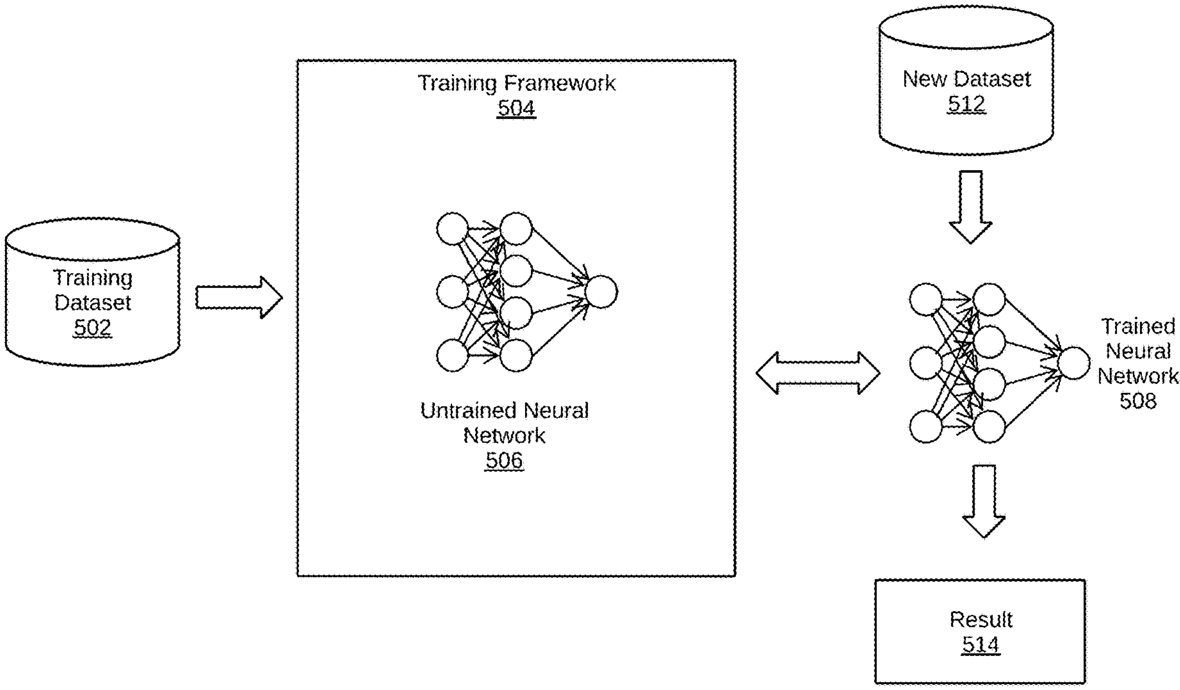
FIG. 5 illustrates training and deployment of a neural network, according to various embodiments.

FIG. 5 illustrates training and deployment of a deep neural network, according to at least one embodiment. In at least one embodiment, untrained neural network 506 may be trained using a training dataset 502. In at least one embodiment, training framework 504 may be a PyTorch framework, whereas in other embodiments, training framework 504 may be a TensorFlow, Boost, Caffe, Microsoft Cognitive Toolkit/CNTK, MXNet, Chainer, Keras, Deeplearning4j, or other training framework. In at least one embodiment, training framework 504 may train an untrained neural network 506 and enable it to be trained using processing resources described herein to generate a trained neural network 508. In at least one embodiment, weights may be chosen randomly or by pre-training using a deep belief network. In at least one embodiment, training may be performed in either a supervised, partially supervised, or unsupervised manner.

In at least one embodiment, untrained neural network 506 may be trained using supervised learning, wherein training dataset 502 may include an input paired with a desired output for an input, or wherein training dataset 502 may include input having a known output and an output of neural network 506 is manually graded. In at least one embodiment, untrained neural network 506 may be trained in a supervised manner and processes inputs from training dataset 502 and may compare resulting outputs against a set of expected or desired outputs. In at least one embodiment, errors then may be propagated back through untrained neural network 506. In at least one embodiment, training framework 504 may adjust weights that control untrained neural network 506. In at least one embodiment, training framework 504 may include tools to monitor how well untrained neural network 506 is converging towards a model, such as trained neural network 508, suitable to generating correct answers, such as in result 514, based on input data such as a new dataset 512. In at least one embodiment, training framework 504 trains untrained neural network 506 repeatedly while adjust weights to refine an output of untrained neural network 506 using a loss function and adjustment algorithm, such as stochastic gradient descent. In at least one embodiment, training framework 504 trains untrained neural network 506 until untrained neural network 506 achieves a desired accuracy. In at least one embodiment, trained neural network 508 can then be deployed to implement any number of machine learning operations.

In at least one embodiment, untrained neural network 506 is trained using unsupervised learning, wherein untrained neural network 506 attempts to train itself using unlabeled data. In at least one embodiment, unsupervised learning training dataset 502 will include input data without any associated output data or "ground truth" data. In at least one embodiment, untrained neural network 506 can learn groupings within training dataset 502 and can determine how individual inputs are related to untrained dataset 502. In at least one embodiment, unsupervised training can be used to generate a self-organizing map in trained neural network 508 capable of performing operations useful in reducing dimensionality of new dataset 512. In at least one embodiment, unsupervised training can also be used to perform anomaly detection, which allows identification of data points in new dataset 512 that deviate from normal patterns of new dataset 512.

In at least one embodiment, semi-supervised learning may be used, which is a technique in which in training dataset 502 may include a mix of labeled and unlabeled data. In at least one embodiment, training framework 504 may be used to perform incremental learning, such as through transferred learning techniques. In at least one embodiment, incremental learning enables trained neural network 508 to adapt to new dataset 512 without forgetting knowledge instilled within trained neural network 508 during initial training.

In at least one embodiment, training framework 504 is a framework processed in connection with a software development toolkit such as an OpenVINO (Open Visual Inference and Neural Network Optimization) toolkit. In at least one embodiment, an OpenVINO toolkit is a toolkit such as those developed by Intel Corporation of Santa Clara, CA.

In at least one embodiment, OpenVINO is a toolkit for facilitating development of applications, specifically neural network applications, for various tasks and operations, such as human vision emulation, speech recognition, natural language processing, recommendation systems, and/or variations thereof. In at least one embodiment, OpenVINO supports neural networks such as convolutional neural networks (CNNs), recurrent and/or attention-based neural networks, and/or various other neural network models. In at least one embodiment, OpenVINO supports various software libraries such as OpenCV, OpenCL, and/or variations thereof.

In at least one embodiment, OpenVINO supports neural network models for various tasks and operations, such as classification, segmentation, object detection, face recognition, speech recognition, pose estimation (e.g., humans and/or objects), monocular depth estimation, image inpainting, style transfer, action recognition, colorization, and/or variations thereof.

In at least one embodiment, OpenVINO comprises one or more software tools and/or modules for model optimization, also referred to as a model optimizer. In at least one embodiment, a model optimizer is a command line tool that facilitates transitions between training and deployment of neural network models. In at least one embodiment, a model optimizer optimizes neural network models for execution on various devices and/or processing units, such as a GPU, CPU, PPU, GPGPU, and/or variations thereof. In at least one embodiment, a model optimizer generates an internal representation of a model, and optimizes said model to generate an intermediate representation. In at least one embodiment, a model optimizer reduces a number of layers of a model. In at least one embodiment, a model optimizer removes layers of a model that are utilized for training. In at least one embodiment, a model optimizer performs various neural network operations, such as modifying inputs to a model (e.g., resizing inputs to a model), modifying a size of inputs of a model (e.g., modifying a batch size of a model), modifying a model structure (e.g., modifying layers of a model), normalization, standardization, quantization (e.g., converting weights of a model from a first representation, such as floating point, to a second representation, such as integer), and/or variations thereof.

In at least one embodiment, Open VINO comprises one or more software libraries for inferencing, also referred to as an inference engine. In at least one embodiment, an inference engine is a C++ library, or any suitable programming language library. In at least one embodiment, an inference engine is utilized to infer input data. In at least one embodiment, an inference engine implements various classes to infer input data and generate one or more results. In at least one embodiment, an inference engine implements one or more API functions to process an intermediate representation, set input and/or output formats, and/or execute a model on one or more devices.

In at least one embodiment, OpenVINO provides various abilities for heterogeneous execution of one or more neural network models. In at least one embodiment, heterogeneous execution, or heterogeneous computing, refers to one or more computing processes and/or systems that utilize one or more types of processors and/or cores. In at least one embodiment, OpenVINO provides various software functions to execute a program on one or more devices. In at least one embodiment, OpenVINO provides various software functions to execute a program and/or portions of a program on different devices. In at least one embodiment, Open VINO provides various software functions to, for example, run a first portion of code on a CPU and a second portion of code on a GPU and/or FPGA. In at least one embodiment, OpenVINO provides various software functions to execute one or more layers of a neural network on one or more devices (e.g., a first set of layers on a first device, such as a GPU, and a second set of layers on a second device, such as a CPU).

In at least one embodiment, OpenVINO may include various functionality similar to functionalities associated with a CUDA programming model, such as various neural network model operations associated with frameworks such as TensorFlow, PyTorch, and/or variations thereof. In at least one embodiment, one or more CUDA programming model operations are performed using OpenVINO. In at least one embodiment, various systems, methods, and/or techniques described herein are implemented using OpenVINO.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, generative AI, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models—such as one or more large language models (LLMs), one or more vision language models (VLMs), one or more multi-modal language models, etc., systems for performing light transport simulation, systems for performing collaborative content creation for 3D assets, systems implemented at least partially using cloud computing resources, and/or other types of systems.

In some embodiments, the systems and methods described herein may be performed within a simulation environment (e.g., NVIDIA's DriveSIM, NVIDIA's ISAAC GYM, NVIDIA's ISAAC SIM, etc.) using simulated data (e.g., simulated sensor data of simulated sensors of a virtual or simulated machine). For example, simulated sensor data may be used (e.g., processed using one or more machine learning models, neural networks, etc.) to identify, detect, and/or classify lane lines, road boundary lines, other lines, vertical structures/features, etc. within the simulation environment using points of a curve and/or one or more curve fitting algorithms, and may use this information to perform operations (e.g., control, navigation, planning, etc. operations) associated with the virtual machine within the environment. These simulated operations may be used to test performance of the underlying algorithms, systems, and/or processes prior to deploying them in the real-world. In some instances, the simulation may be used to generate synthetic training data—e.g., training data including regions of interest and/or sub-regions of interest from within the simulation. In some embodiments, other methods may be used in addition or alternatively from a simulation to generate synthetic training data. For example, the synthetic training data may be generated using neural radiance fields (NeRFs), Gaussian splat techniques, diffusion models, electrostatic models (e.g., Poisson flow generative models (PFGMs), etc. The synthetic training data (in addition to or alternatively from real-world data) may then be processed to determine geometry, curvature, semantic information, classification information, and/or other information related to features of interest, such as lines, longitudinal features (e.g., poles), and/or other features within a driving environment, a warehouse, etc., for example. In any example, such as where a simulation environment is used for testing, validation, training, etc., the simulation environment and/or associated training data may be rendered or otherwise generated using one or more light transport algorithms—such as ray-tracing and/or path-tracing algorithms. In some embodiments, the simulation environment and/or one or more objects, features, or components thereof may be generated or managed within a three-dimensional (3D) content collaboration platform (e.g., NVIDIA's OMNIVERSE) for industrial digitalization, generative physical AI, and/or other use cases, applications, or services. For example, the content collaboration platform or system may include a system that uses universal scene descriptor (USD) (e.g., OpenUSD) data for managing objects, features, scenes, etc. within a simulated environment, digital environment, etc. The platform may include real physics simulation, such as using NVIDIA's PhysX SDK, in order to simulate real physics and physical interactions with simulations hosted by the platform. The platform may integrate OpenUSD along with ray tracing/path tracing/light transport simulation (e.g., NVIDIA's RTX rendering technologies) into software tools and simulation workflows for building, training, deploying, or testing AI systems—such as systems for testing, validating, training (e.g., machine learning models, neural networks, etc.), and/or other tasks related to automotive, robot, machine, or other applications.

In some embodiments, teleoperation or remote control of a vehicle or other machine may be performed using a remote control or teleoperation system. For example, the systems and methods described herein may be used to identify lane lines, road boundary lines, longitudinal features, etc. that may be included in a visualization or mapping of an environment to aid a remote operator in controlling—or providing waypoints or other indications of control or navigation—an autonomous or semi-autonomous machine through an environment.

In some embodiments, the system and methods described herein may be deployed in a robotics application. For example, a robot or robotic system may include one or more onboard processors (e.g., CPUs, GPUs, hardware-based deep learning accelerators (DLAs), hardware-based programmable vision accelerators (PVAs)—which may include one or more vector processing units (VPUs), direct memory access (DMA) systems, and/or pixel processing engines (PPEs), hardware-based optical flow accelerators (OFAs), SoCs, etc.) and memory and/or storage (e.g., for storing control algorithms, sensor data, and one or more machine learning models). The robotic system may use these processors to execute one or more machine learning models (e.g., language models) that allow it to perform complex tasks autonomously or semi-autonomously, such as interacting with and/or manipulating static and/or dynamic objects, or navigating environments using sensors such as cameras, LiDAR, RADAR, ultrasonic sensors, and more. The system may use sensor fusion techniques to combine data from multiple sensors (e.g., cameras, infrared, LiDAR, RADAR, accelerometers) to create a comprehensive model of the robot's surroundings. This data may be processed locally on the robot or sent to remote servers for more computationally intensive tasks, such as 3D mapping or SLAM (Simultaneous Localization and Mapping). In one or more embodiments, data from individual robots (e.g., sensor data, task status, or environmental conditions) may be uploaded to the cloud, where centralized AI models can analyze and distribute optimized commands to an entire fleet. In some embodiments, the machine learning model(s) (e.g., language models, VLMs, LLMs, MMLMs, diffusion models, NeRF models, DNNs, etc.) described herein may be used to allow the robot to perceive and reason about the environment and/or communicate with one or more other robots and/or persons in an environment. In some embodiments, the robot may communicate (e.g., using one or more network interface cards (NICs) and/or data processing units (DPUs)) with one or more locally hosted servers/computing devices and/or with one or more remotely located servers/computing devices (e.g., in one or more data centers).

Example Language Models

In at least some embodiments, language models, such as large language models (LLMs) and/or other types of generative artificial intelligence (AI) may be implemented. These models may be capable of understanding, summarizing, translating, and/or otherwise generating text (e.g., natural language text, code, etc.), images, video, computer aided design (CAD) assets, omniverse and/or metaverse file information (e.g., in USD format), and/or the like, based on the context provided in input prompts or queries. These language models may be considered "large," in embodiments, based on the models being trained on massive datasets and having architectures with large number of learnable network parameters (weights and biases)—such as millions or billions of parameters. The LLMs/VLMs/etc. may be implemented for summarizing textual data, analyzing and extracting insights from data (e.g., textual, image, video, etc.), and generating new text/image/video/etc. in user-specified styles, tones, or formats. The LLMs of the present disclosure may be used exclusively for text processing, in embodiments, whereas in other embodiments, multi-modal LLMs may be implemented to accept, understand, and/or generate text along with other types of content like images, audio, and/or video. For example, vision language models (VLMs), or more generally multi-modal language models, may be implemented to accept image, video, audio, textual, 3D design (e.g., CAD), and/or other inputs data types and/or to generate or output image, video, audio, textual, 3D design, and/or other output data types.

Various types of LLM/VLM/etc. architectures may be implemented in various embodiments. For example, different architectures may be implemented that use different techniques for understanding and generating outputs—such as text, audio, video, image, etc. In some embodiments, LLM architectures such as recurrent neural networks (RNNs) or long short-term memory networks (LSTMs) may be used, while in other embodiments transformer architectures—such as those that rely on self-attention mechanisms—may be used to understand and recognize relationships between words or tokens. The language models of the present disclosure may include encoder and/or decoder block(s). For example, discriminative or encoder-only LLMs like BERT (Bidirectional Encoder Representations from Transformers) may be implemented for tasks that involve language comprehension such as classification, sentiment analysis, question answering, and named entity recognition. As another example, generative or decoder-only LLMs like GPT (Generative Pretrained Transformer) may be implemented for tasks that involve language and content generation such as text completion, story generation, and dialogue generation. LLMs that include both encoder and decoder components like T5 (Text-to-Text Transformer) may be implemented to understand and generate content, such as for translation and summarization. These examples are not intended to be limiting, and any architecture type—including but not limited to those described herein—may be implemented depending on the particular embodiment and the task(s) being performed using the model(s).

In some examples, the machine learning model(s) (e.g., deep neural networks, language models, LLMs, VLMs, multi-modal language models, perception models, tracking models, fusion models, transformer models, diffusion models, encoder-only models, decoder-only models, encoder-decoder models, neural radiance field (NeRF) models, etc.) described herein may be packaged as a microservice—such an inference microservice (e.g., NVIDIA NIMs)—which may include a container (e.g., an operating system (OS)-level virtualization package) that may include an application programming interface (API) layer, a server layer, a runtime layer, and/or a model "engine." For example, the inference microservice may include the container itself and the model(s) (e.g., weights and biases). In some instances, such as where the machine learning model(s) is small enough (e.g., has a small enough number of parameters), the model(s) may be included within the container itself. In other examples—such as where the model(s) is large—the model(s) may be hosted/stored in the cloud (e.g., in a data center) and/or may be hosted on-premises and/or at the edge (e.g., on a local server or computing device, but outside of the container). In such embodiments, the model(s) may be accessible via one or more APIs—such as REST APIs. As such, and in some embodiments, the machine learning model(s) described herein may be deployed as an inference microservice to accelerate deployment of a model(s) on any cloud, data center, or edge computing system, while ensuring the data is secure. For example, the inference microservice may include one or more APIs, a pre-configured container for simplified deployment, an optimized inference engine (e.g., built using a standardized AI model deployment an execution software, such as NVIDIA's Triton Inference Server, and/or one or more APIs for high performance deep learning inference, which may include an inference runtime and model optimizations that deliver low latency and high throughput for production applications—such as NVIDIA's TensorRT), and/or enterprise management data for telemetry (e.g., including identity, metrics, health checks, and/or monitoring). The machine learning model(s) described herein may be included as part of the microservice along with an accelerated infrastructure with the ability to deploy with a single command and/or orchestrate and auto-scale with a container orchestration system on accelerated infrastructure (e.g., on a single device up to data center scale). As such, the inference microservice may include the machine learning model(s) (e.g., that has been optimized for high performance inference), an inference runtime software to execute the machine learning model(s) and provide outputs/responses to inputs (e.g., user queries, prompts, etc.), and enterprise management software to provide health checks, identity, and/or other monitoring. In some embodiments, the inference microservice may include software to perform in-place replacement and/or updating to the machine learning model(s). When replacing or updating, the software that performs the replacement/updating may maintain user configurations of the inference runtime software and enterprise management software.

In various embodiments, the LLMs/VLMs/etc. may be trained using unsupervised learning, in which an LLM learns patterns from large amounts of unlabeled text/audio/video/image/etc. data. Due to the extensive training, in embodiments, the models may not require task-specific or domain-specific training. LLMs that have undergone extensive pre-training on vast amounts of unlabeled text data may be referred to as foundation models and may be adept at a variety of tasks like question-answering, summarization, filling in missing information, and translation. Some LLMs may be tailored for a specific use case using techniques like prompt tuning, fine-tuning, retrieval augmented generation (RAG), adding adapters (e.g., customized neural networks, and/or neural network layers, that tune or adjust prompts or tokens to bias the language model toward a particular task or domain), and/or using other fine-tuning or tailoring techniques that optimize the models for use on particular tasks and/or within particular domains.

Figure 6A:
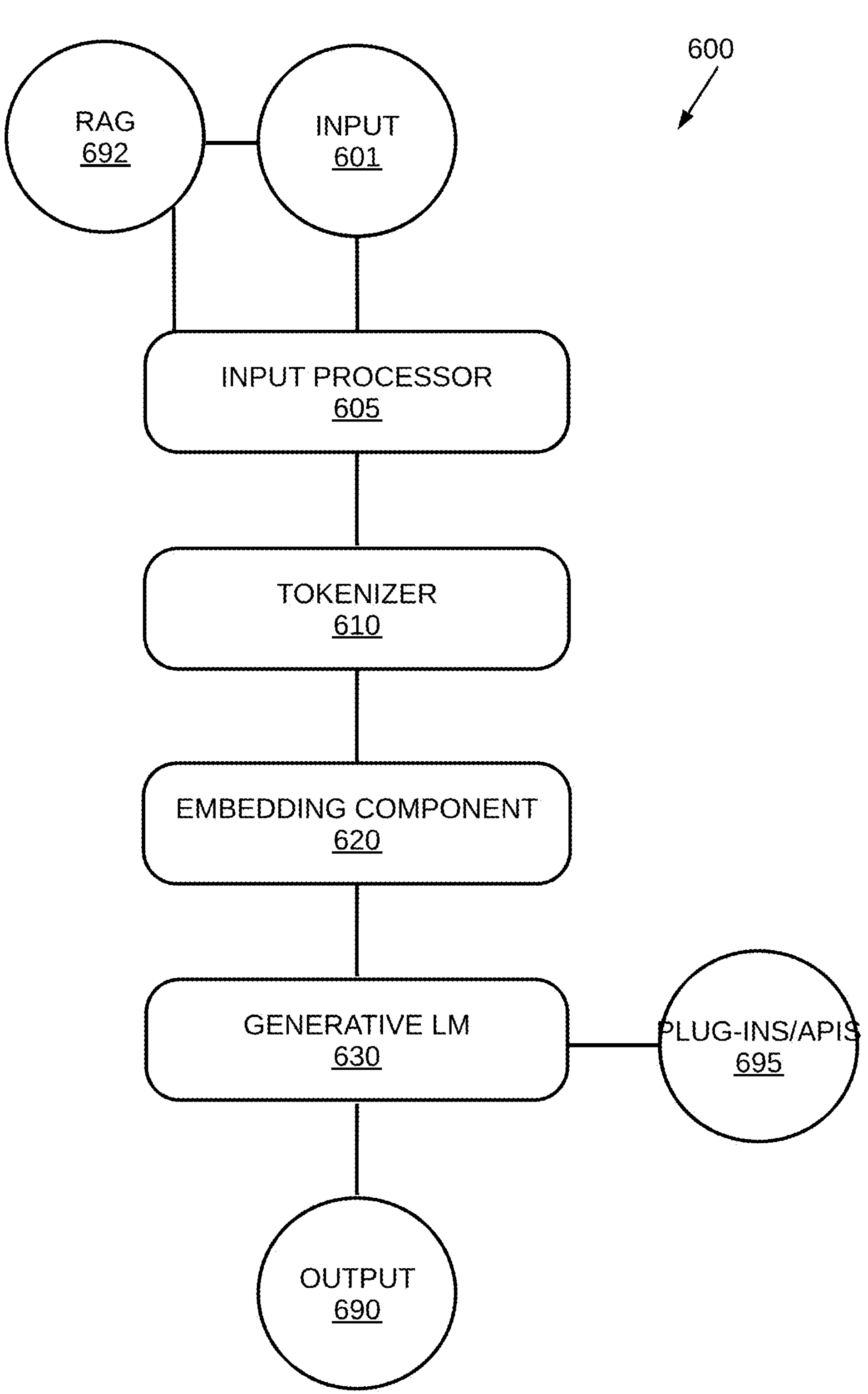
FIG. 6A is a block diagram of an example generative language model system suitable for use in implementing some embodiments of the present disclosure.

FIG. 6A is a block diagram of an example generative language model system 600 suitable for use in implementing at least some embodiments of the present disclosure. In the example illustrated in FIG. 6A, the generative language model system 600 may include a retrieval augmented generation (RAG) component 692, an input processor 605, a tokenizer 610, an embedding component 620, plug-ins/APIs 695, and a generative language model (LM) 630 (which may include an LLM, a VLM, a multi-modal LM, etc.).

At a high level, the input processor 605 may receive an input 601 comprising text and/or other types of input data (e.g., audio data, video data, image data, sensor data (e.g., LiDAR, RADAR, ultrasonic, etc.), 3D design data, CAD data, universal scene descriptor (USD) data, etc.), depending on the architecture of the generative LM 630. In some embodiments, the input 601 may include plain text in the form of one or more sentences, paragraphs, and/or documents. Additionally or alternatively, the input 601 may include numerical sequences, precomputed embeddings (e.g., word or sentence embeddings), and/or structured data (e.g., in tabular formats, JSON, or XML). In some implementations in which the generative LM 630 is capable of processing multi-modal inputs, the input 601 may combine text with image data, audio data, and/or other types of input data, such as but not limited to those described herein. Taking raw input text as an example, the input processor 605 may prepare raw input text in various ways. For example, the input processor 605 may perform various types of text cleaning to remove noise (e.g., special characters, punctuation, HTML tags, stopwords) from relevant textual content. In an example involving stopwords (common words that tend to carry little semantic meaning), the input processor 605 may remove stopwords to reduce noise and focus the generative LM 630 on more meaningful content. The input processor 605 may apply text normalization, for example, by converting all characters to lowercase, removing accents, and/or or handling special cases like contractions or abbreviations to ensure consistency. These are just a few examples, and other types of input processing may be applied.

In some embodiments, a RAG component 692 may be used to retrieve additional information to be used as part of the input 601 or prompt. For example, in some embodiments, the input 601 may be generated using the query or input to the model (e.g., a question, a request, etc.) in addition to data retrieved using the RAG component 692. In some embodiments, the input processor 605 may analyze the input 601 and communicate with the RAG component 692 (or the RAG component 692 may be part of the input processor 605, in embodiments) in order to identify relevant text and/or other data to provide to the generative LM 630 as additional context or sources of information from which to identify the response, answer, or output 690, generally. For example, where the input indicates that a particular path or a step of a path is to be traversed, the RAG component 692 may retrieve—using a vector search in an embedding space, for example—spatial and temporal data, in the form of a textual query for the path or step. Similarly, where the input indicates presence or absence of a particular obstacle, including size, shape, and/or location of the obstacle, the RAG component 692 may retrieve data for a prior traversal, that data along with the current data regarding the obstacle as part of the input 601 to the generative LM 630.

The tokenizer 610 may segment the (e.g., processed) text into smaller units (tokens) for subsequent analysis and processing. The tokens may represent individual words, subwords, characters, etc., depending on the implementation. Word-based tokenization divides the text into individual words, treating each word as a separate token. Subword tokenization breaks down words into smaller meaningful units (e.g., prefixes, suffixes, stems), enabling the generative LM 630 to understand morphological variations and handle out-of-vocabulary words more effectively. Character-based tokenization represents each character as a separate token, enabling the generative LM 630 to process text at a fine-grained level. The choice of tokenization strategy may depend on factors such as the language being processed, the task at hand, and/or characteristics of the training dataset. As such, the tokenizer 610 may convert the (e.g., processed) text into a structured format according to tokenization schema being implemented in the particular embodiment.

The embedding component 620 may use any known embedding technique to transform discrete tokens into (e.g., dense, continuous vector) representations of semantic meaning. For example, the embedding component 620 may use pre-trained word embeddings (e.g., Word2Vec, GloVe, or FastText), one-hot encoding, Term Frequency-Inverse Document Frequency (TF-IDF) encoding, one or more embedding layers of a neural network, and/or otherwise.

In some implementations in which the input 601 may include image data, the input processor 601 may resize the image data to a standard size compatible with format of a corresponding input channel and/or may normalize pixel values to a common range (e.g., 0 to 1) to ensure a consistent representation, and the embedding component 620 may encode the image data using any known technique (e.g., using one or more convolutional neural networks (CNNs) to extract visual features). In some implementations in which the input 601 may include audio data, the input processor 601 may resample an audio file to a consistent sampling rate for uniform processing, and the embedding component 620 may use any known technique to extract and encode audio features—such as in the form of a spectrogram (e.g., a mel-spectrogram). In some implementations in which the input 601 may include video data, the input processor 601 may extract frames or apply resizing to extracted frames, and the embedding component 620 may extract features such as optical flow embeddings or video embeddings and/or may encode temporal information or sequences of frames. In some implementations in which the input 601 may include multi-modal data, the embedding component 620 may fuse representations of the different types of data (e.g., text, image, audio) using techniques like early fusion (concatenation), late fusion (sequential processing), attention-based fusion, etc.

The generative LM 630 and/or other components of the generative LLM system 600 may use different types of neural network architectures depending on the implementation. For example, transformer-based architectures such as those used in models like GPT may be implemented, and may include self-attention mechanisms that weigh the importance of different words or tokens in the input sequence and/or feedforward networks that process the output of the self-attention layers, applying non-linear transformations to the input representations and extracting higher-level features. Some non-limiting example architectures include transformers (e.g., encoder-decoder, decoder only, multi-modal), RNNs, LSTMs, fusion models, cross-modal embedding models that learn joint embedding spaces, graph neural networks (GNNs), hybrid architectures combining different types of architectures adversarial networks like generative adversarial networks or GANs or adversarial autoencoders (AAEs) for joint distribution learning, and others. As such, depending on the implementation and architecture, the embedding component 620 may apply an encoded representation of the input 601 to the generative LM 630, and the generative LM 630 may process the encoded representation of the input 601 to generate an output 690, which may include text and/or other types of data for use in a query to TKG 242.

As described herein, in some embodiments, the generative LM 630 may be configured to access or use—or capable of accessing or using—plug-ins/APIs 695 (which may include one or more plug-ins, application programming interfaces (APIs), databases, data stores, repositories, etc.). For example, for certain tasks or operations that the generative LM 630 is not ideally suited for, the model may have instructions (e.g., as a result of training, and/or based on instructions in a given prompt, such as those retrieved using the RAG component 692) to access one or more plug-ins/APIs 695 (e.g., 3rd party plugins) for help in processing the current input. In such an example, where at least part of a prompt may be related to a particular environment or condition within an environment—for example, an area in a warehouse, a floor or portion of a floor in a home or apartment building, a floor or portion of a floor in an office building, a desired path within the environment, or one or more identified obstacles within the environment—the model may access one or more environment or condition plug-ins (e.g., via one or more APIs, though for a TKG the APIs may not be required), send at least a portion of the prompt related to the particular plug-in/API 695 to the plug-in/API 695, the plug-in/API 695 may process the information and return an answer to the generative LM 630, and the generative LM 630 may use the response to generate the output 690. This process may be repeated—e.g., recursively—for any number of iterations and using any number of plug-ins/APIs 695 until an output 690 that addresses each ask/question/request/process/operation/etc. from the input 601 can be generated. As such, the model(s) may not only rely on its own knowledge from training on a large dataset(s) and/or from data retrieved using the RAG component 692, but also on the expertise or optimized nature of one or more external resources—such as the plug-ins/APIs 695.

Figure 6B:
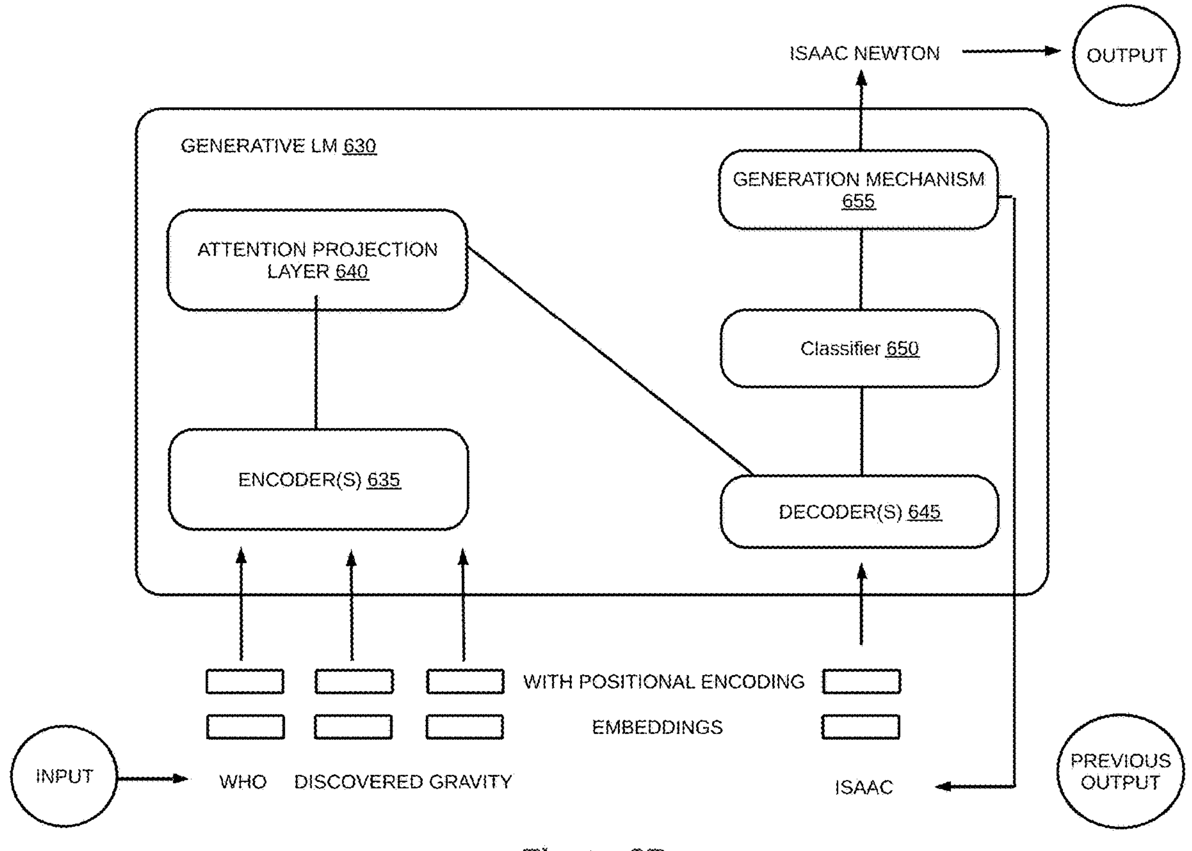
FIG. 6B is a block diagram of an example generative language model that includes a transformer encoder-decoder suitable for use in implementing some embodiments of the present disclosure.

FIG. 6B is a block diagram of an example implementation in which the generative LM 630 may include a transformer encoder-decoder. For example, assume input text such as "Who discovered gravity" is tokenized (e.g., by the tokenizer 610 of FIG. 6A) into tokens such as words, and each token is encoded (e.g., by the embedding component 620 of FIG. 6A) into a corresponding embedding (e.g., of size 512). Since these token embeddings typically do not represent the position of the token in the input sequence, any known technique may be used to add a positional encoding to each token embedding to encode the sequential relationships and context of the tokens in the input sequence. As such, the (e.g., resulting) embeddings may be applied to one or more encoder(s) 635 of the generative LM 630.

In an example implementation, the encoder(s) 635 forms an encoder stack, where each encoder may include a self-attention layer and a feedforward network. In an example transformer architecture, each token (e.g., word) flows through a separate path. As such, each encoder may accept a sequence of vectors, passing each vector through the self-attention layer, then the feedforward network, and then upwards to the next encoder in the stack. Any known self-attention technique may be used. For example, to calculate a self-attention score for each token (word), a query vector, a key vector, and a value vector may be created for each token, a self-attention score may be calculated for pairs of tokens by taking the dot product of the query vector with the corresponding key vectors, normalizing the resulting scores, multiplying by corresponding value vectors, and summing weighted value vectors. The encoder may apply multi-headed attention in which the attention mechanism is applied multiple times in parallel with different learned weight matrices. Any number of encoders may be cascaded to generate a context vector encoding the input. An attention projection layer 640 may convert the context vector into attention vectors (keys and values) for the decoder(s) 645.

In an example implementation, the decoder(s) 645 form a decoder stack, where each decoder may include a self-attention layer, an encoder-decoder self-attention layer that uses the attention vectors (keys and values) from the encoder to focus on relevant parts of the input sequence, and a feedforward network. As with the encoder(s) 635, in an example transformer architecture, each token (e.g., word) flows through a separate path in the decoder(s) 645. During a first pass, the decoder(s) 645, a classifier 650, and a generation mechanism 655 may generate a first token, and the generation mechanism 655 may apply the generated token as an input during a second pass. The process may repeat in a loop, successively generating and adding tokens (e.g., words) to the output from the preceding pass and applying the token embeddings of the composite sequence with positional encodings as an input to the decoder(s) 645 during a subsequent pass, sequentially generating one token at a time (known as auto-regression) until predicting a symbol or token that represents the end of the response. Within each decoder, the self-attention layer is typically constrained to attend only to preceding positions in the output sequence by applying a masking technique (e.g., setting future positions to negative infinity) before the softmax operation. In an example implementation, the encoder-decoder attention layer operates similarly to the (e.g., multi-headed) self-attention in the encoder(s) 635, except that it creates its queries from the layer below it and takes the keys and values (e.g., matrix) from the output of the encoder(s) 635.

As such, the decoder(s) 645 may output some decoded (e.g., vector) representation of the input being applied during a particular pass. The classifier 650 may include a multi-class classifier comprising one or more neural network layers that project the decoded (e.g., vector) representation into a corresponding dimensionality (e.g., one dimension for each supported word or token in the output vocabulary) and a softmax operation that converts logits to probabilities. As such, the generation mechanism 655 may select or sample a word or token based on a corresponding predicted probability (e.g., select the word with the highest predicted probability) and append it to the output from a previous pass, generating each word or token sequentially. The generation mechanism 655 may repeat the process, triggering successive decoder inputs and corresponding predictions until selecting or sampling a symbol or token that represents the end of the response, at which point, the generation mechanism 655 may output the generated response.

Figure 6C:
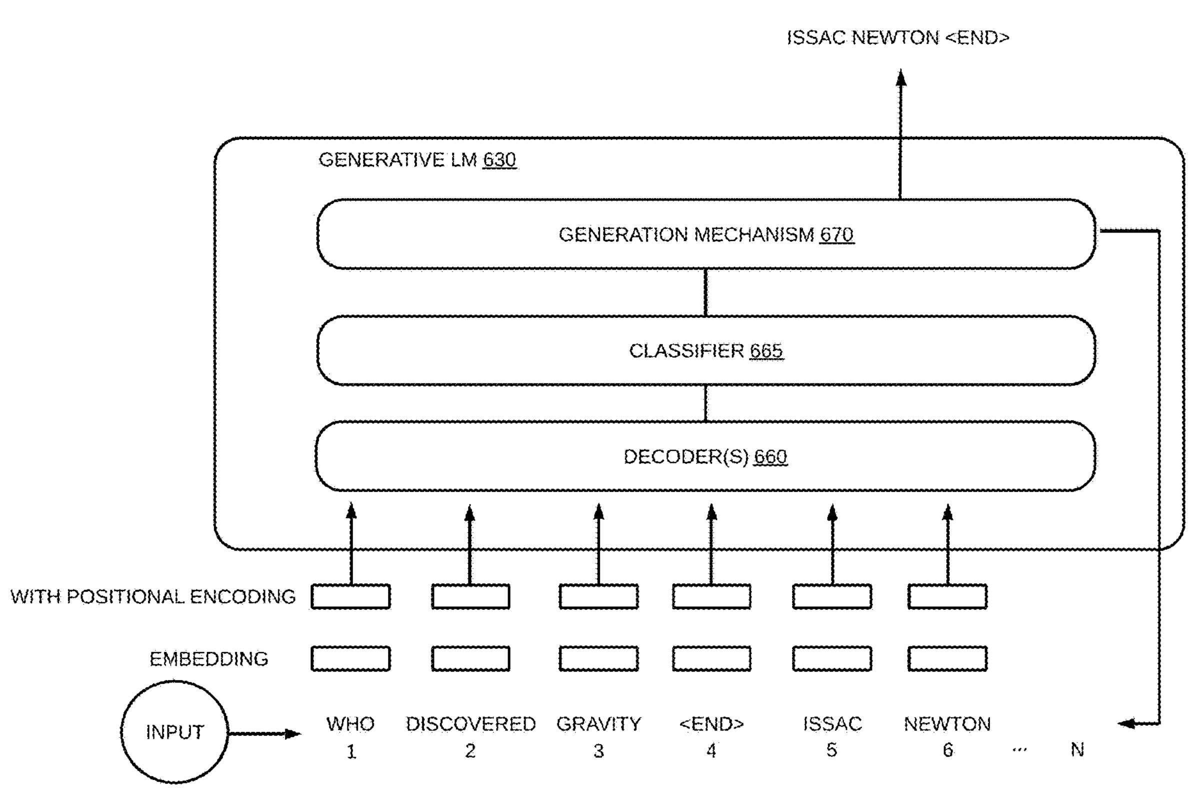
FIG. 6C is a block diagram of an example generative language model that includes a decoder-only transformer architecture suitable for use in implementing some embodiments of the present disclosure.

FIG. 6C is a block diagram of an example implementation in which the generative LM 630 may include a decoder-only transformer architecture. For example, the decoder(s) 660 of FIG. 6C may operate similarly as the decoder(s) 645 of FIG. 6B except each of the decoder(s) 660 of FIG. 6C omits the encoder-decoder self-attention layer (since there is no encoder in this implementation). As such, the decoder(s) 660 may form a decoder stack, where each decoder may include a self-attention layer and a feedforward network. Furthermore, instead of encoding the input sequence, a symbol or token representing the end of the input sequence (or the beginning of the output sequence) may be appended to the input sequence, and the resulting sequence (e.g., corresponding embeddings with positional encodings) may be applied to the decoder(s) 660. As with the decoder(s) 645 of FIG. 6B, each token (e.g., word) may flow through a separate path in the decoder(s) 660, and the decoder(s) 660, a classifier 665, and a generation mechanism 670 may use auto-regression to sequentially generate one token at a time until predicting a symbol or token that represents the end of the response. The classifier 665 and the generation mechanism 670 may operate similarly as the classifier 650 and the generation mechanism 655 of FIG. 6B, with the generation mechanism 670 selecting or sampling each successive output token based on a corresponding predicted probability and appending it to the output from a previous pass, generating each token sequentially until selecting or sampling a symbol or token that represents the end of the response. These and other architectures described herein are meant simply as examples, and other suitable architectures may be implemented within the scope of the present disclosure.

In the context of the present disclosure, for example, where a textual or a visual input is to be provided, generative LM 630 may provide an appropriate output for machine learning model(s) 208 to provide as textual input to TKG 242.

Example Computing Device

Figure 7:
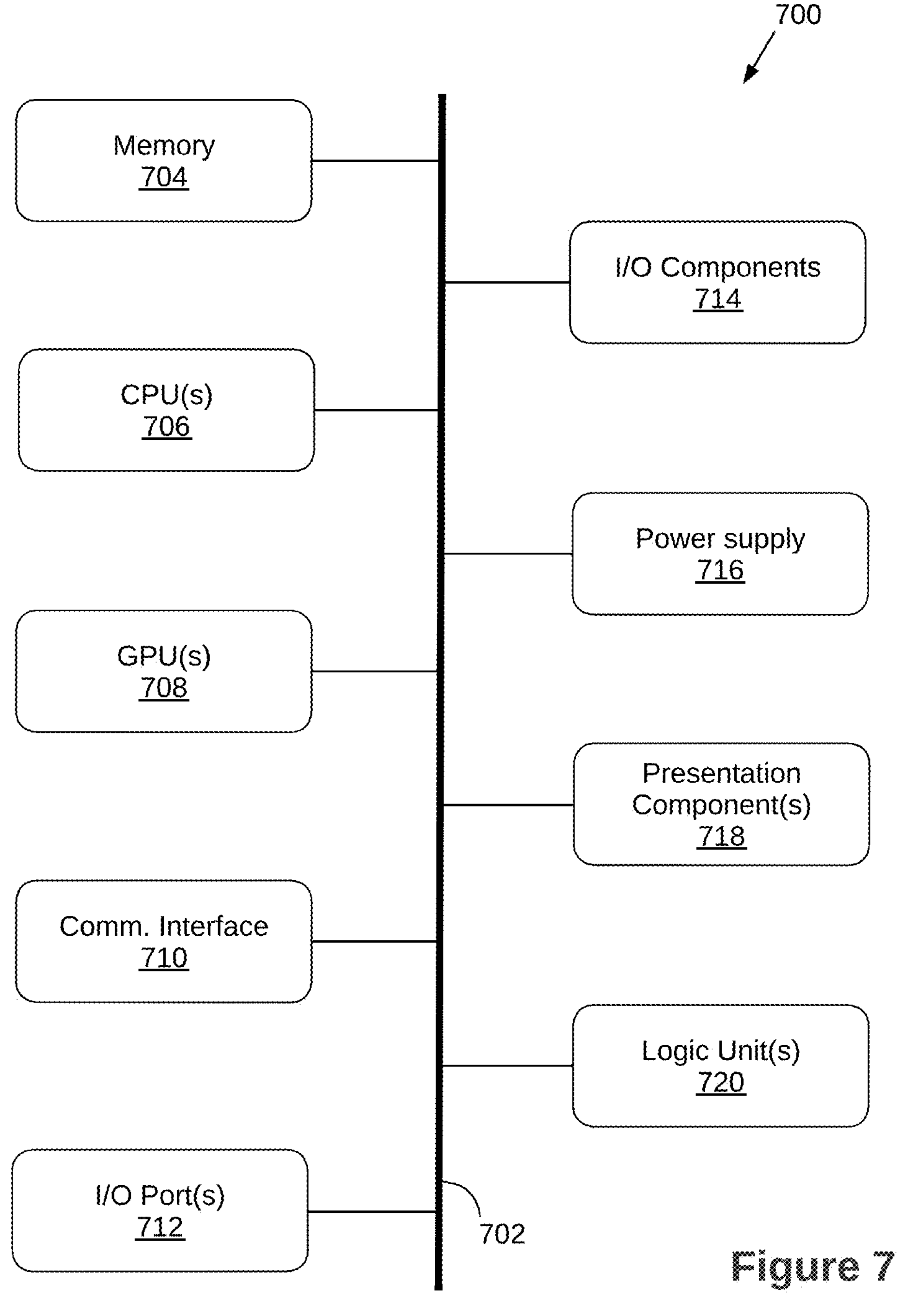
FIG. 7 is a block diagram of an example computing device suitable for use in implementing some embodiments of the present disclosure.

FIG. 7 is a block diagram of an example computing device(s) 700 suitable for use in implementing some embodiments of the present disclosure. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more virtual machines (VMs), and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). As such, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and may include any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. For example, the CPU(s) may be configured to execute one or more instances of data-generation engine 122, training engine 124, and/or path planning prediction engine 126. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Programmable Vision Accelerator (PVAs)—which may include one or more direct memory access (DMA) systems, one or more vision or vector processing units (VPUs), one or more pixel processing engines (PPEs), etc., Vision Processing Units (VPUs), Optical Flow Accelerators (OFAs), Field Programmable Gate Arrays (FPGAs), Neuromorphic Chips, Quantum Processing Units (QPUs), Associative Process Units (APUs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that allow the computing device 700 to communicate with other computing devices via an electronic communication network, included wired and/or wireless communications. The communication interface 710 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 720 and/or communication interface 710 may include one or more data processing units (DPUs) to transmit data received over a network and/or through interconnect system 702 directly to (e.g., a memory of) one or more GPU(s) 708.

The I/O ports 712 may allow the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that allow detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to allow the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, DPUs, etc.), and output the data (e.g., as an image, video, sound, etc.).

Example Data Center

Figure 8:
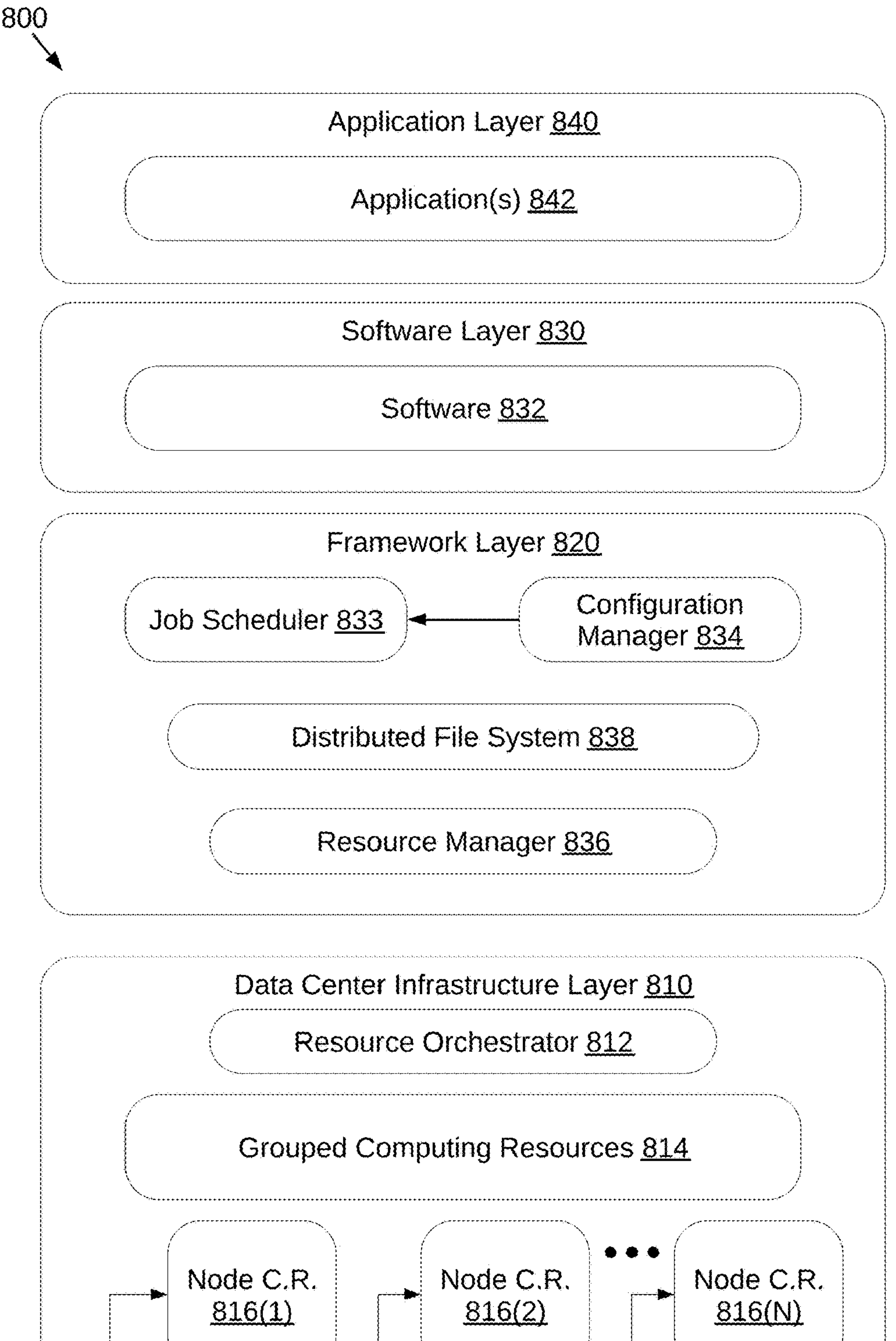
FIG. 8 is a block diagram of an example data center suitable for use in implementing some embodiments of the present disclosure.

FIG. 8 illustrates an example data center 800 that may be used in at least one embodiments of the present disclosure. The data center 800 may include a data center infrastructure layer 810, a framework layer 820, a software layer 830, and/or an application layer 840.

As shown in FIG. 8, the data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 816(1)-816(N) may correspond to a server having one or more of the above-mentioned computing resources. In addition, in some embodiments, the node C.R.s 816(1)-8161(N) may include one or more virtual components, such as vGPUs, vCPUs, and/or the like, and/or one or more of the node C.R.s 816(1)-816(N) may correspond to a virtual machine (VM).

In at least one embodiment, grouped computing resources 814 may include separate groupings of node C.R.s 816 housed within one or more racks (not shown), or many racks housed in data centers at various geographical locations (also not shown). Separate groupings of node C.R.s 816 within grouped computing resources 814 may include grouped compute, network, memory or storage resources that may be configured or allocated to support one or more workloads. In at least one embodiment, several node C.R.s 816 including CPUs, GPUS, DPUs, and/or other processors may be grouped within one or more racks to provide compute resources to support one or more workloads. The one or more racks may also include any number of power modules, cooling modules, and/or network switches, in any combination.

The resource orchestrator 812 may configure or otherwise control one or more node C.R.s 816(1)-816(N) and/or grouped computing resources 814. In at least one embodiment, resource orchestrator 812 may include a software design infrastructure (SDI) management entity for the data center 800. The resource orchestrator 812 may include hardware, software, or some combination thereof.

In at least one embodiment, as shown in FIG. 8, framework layer 820 may include a job scheduler 828, a configuration manager 834, a resource manager 836, and/or a distributed file system 838. The framework layer 820 may include a framework to support software 832 of software layer 830 and/or one or more application(s) 842 of application layer 840. The software 832 or application(s) 842 may respectively include web-based service software or applications, such as those provided by Amazon Web Services, Google Cloud and Microsoft Azure. The framework layer 820 may be, but is not limited to, a type of free and open-source software web application framework such as Apache Spark™ (hereinafter "Spark") that may use distributed file system 838 for large-scale data processing (e.g., "big data"). In at least one embodiment, job scheduler 828 may include a Spark driver to facilitate scheduling of workloads supported by various layers of data center 800. The configuration manager 834 may be capable of configuring different layers such as software layer 830 and framework layer 820 including Spark and distributed file system 838 for supporting large-scale data processing. The resource manager 836 may be capable of managing clustered or grouped computing resources mapped to or allocated for support of distributed file system 838 and job scheduler 828. In at least one embodiment, clustered or grouped computing resources may include grouped computing resource 814 at data center infrastructure layer 810. The resource manager 836 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 838 of framework layer 820. One or more types of software 832 may include, but are not limited to, Internet web page search software, e-mail virus scan software, database software, and streaming video content software. One or more types of software 832 may also, or instead, include data-generation engine 122, training engine 124, and/or path planning prediction engine 126.

In at least one embodiment, application(s) 842 included in application layer 840 may include one or more types of applications used by at least portions of node C.R.s 816(1)-816(N), grouped computing resources 814, and/or distributed file system 838 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 834, resource manager 836, and resource orchestrator 812 may implement any number and type of self-modifying actions based on any amount and type of data acquired in any technically feasible fashion. Self-modifying actions may relieve a data center operator of data center 800 from making possibly bad configuration decisions and possibly avoiding underutilized and/or poor performing portions of a data center.

The data center 800 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 800. In at least one embodiment, trained or deployed machine learning models corresponding to one or more neural networks may be used to infer or predict information using resources described above with respect to the data center 800 by using weight parameters calculated through one or more training techniques, such as but not limited to those described herein.

In at least one embodiment, the data center 800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 800, an example of which is described in more detail herein with respect to FIG. 8.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network may include a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Example Autonomous Vehicle

Figure 9A:
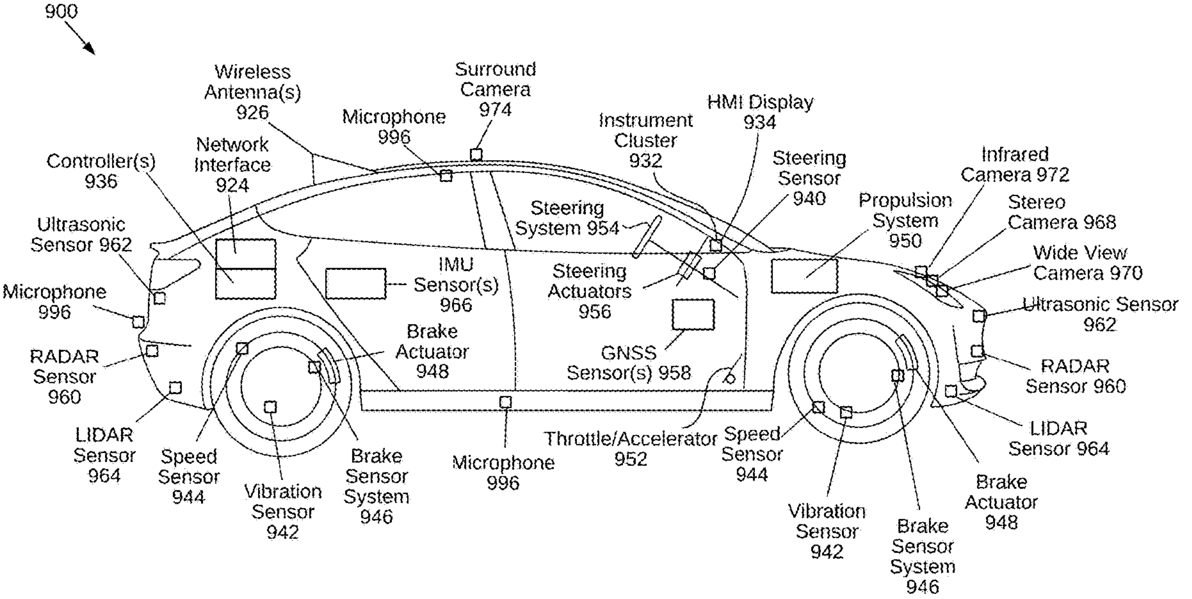
FIG. 9A is an illustration of an example autonomous vehicle, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3-Level 5 of the autonomous driving levels. The vehicle 900 may be capable of functionality in accordance with one or more of Level 1-Level 5 of the autonomous driving levels. For example, the vehicle 900 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 900 or other machine, such as being fully autonomous, being highly autonomous, being conditionally autonomous, being partially autonomous, providing assistive autonomy, being semi-autonomous, being primarily autonomous, or other designation.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems ("GNSS") sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor(s) (e.g., as part of the brake sensor system 946), and/or other sensor types.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the High Definition ("HD") map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 900 further may include a network interface 924 which may use one or more wireless antenna(s) 926 and/or modem(s) to communicate over one or more networks. For example, the network interface 924 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 926 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 9B:
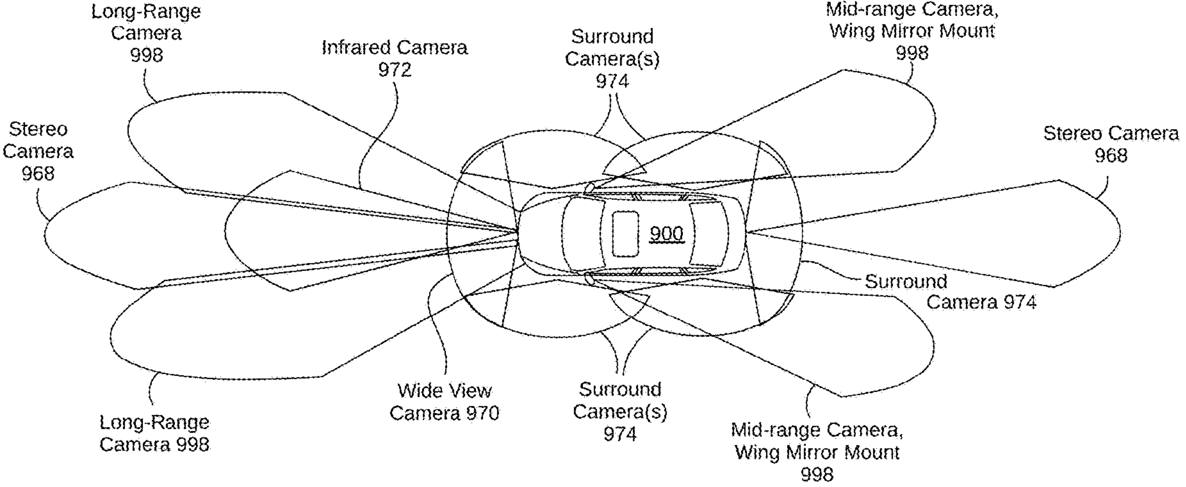
FIG. 9B is an example of camera locations and fields of view for the example autonomous vehicle of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that may include a complementary metal oxide semiconductor ("CMOS") color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may be any number (including zero) of wide-view cameras 970 on the vehicle 900. In addition, any number of long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

Any number of stereo cameras 968 may also be included in a front-facing configuration. In at least one embodiment, one or more of stereo camera(s) 968 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. Four example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Figure 9C:
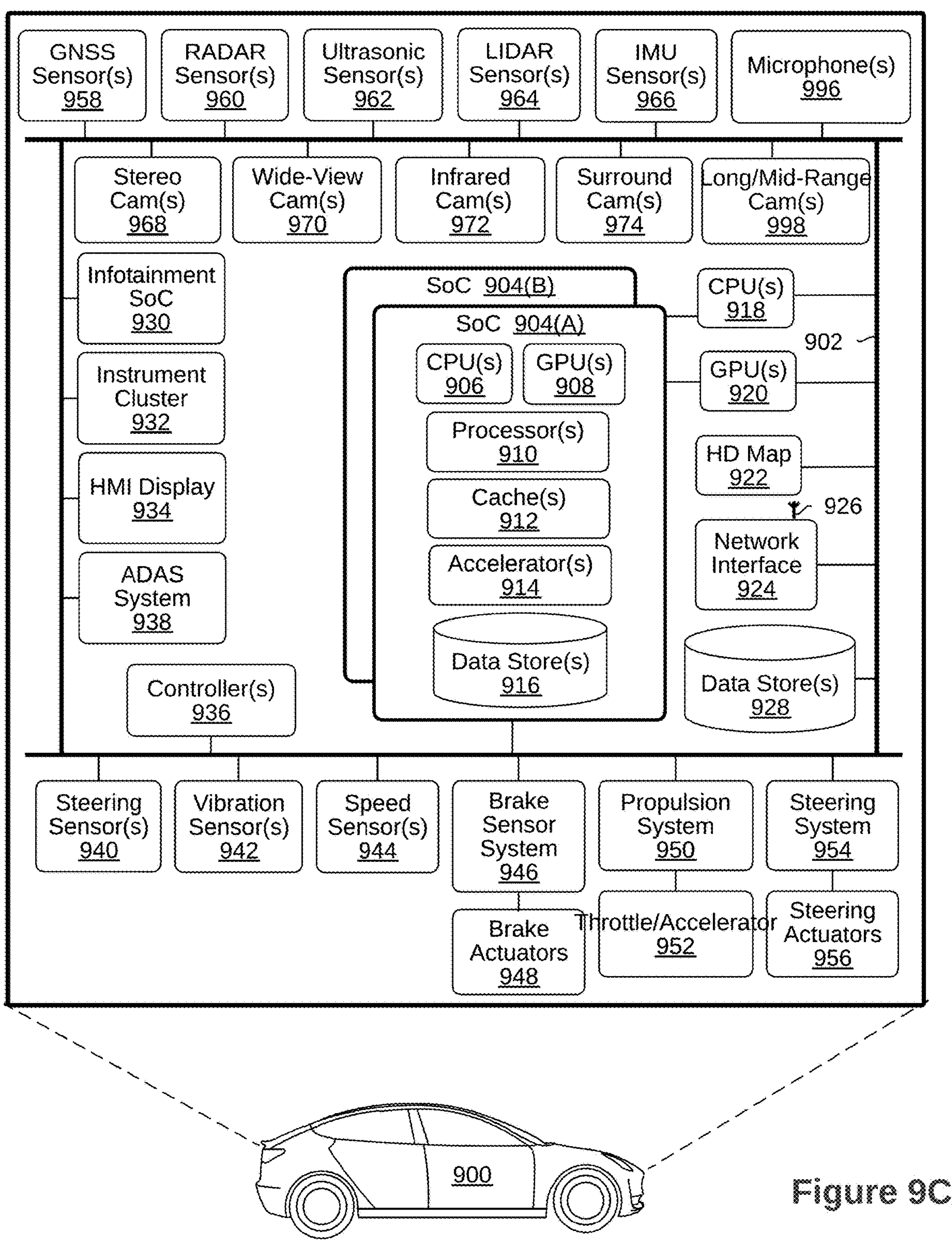
FIG. 9C is a block diagram of an example system architecture for the example autonomous vehicle of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol. In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s) 912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include an arithmetic logic unit(s) (ALU(s)) which may be leveraged in performing processing with respect to any of the variety of tasks or operations of the vehicle 900—such as processing DNNs. In addition, the SoC(s) 904 may include a floating point unit(s) (FPU(s))—or other math coprocessor or numeric coprocessor types—for performing mathematical operations within the system. For example, the SoC(s) 904 may include one or more FPUs integrated as execution units within a CPU(s) 906 and/or GPU(s) 908.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term “CNN,” as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events. The DLA(s) may also execute one or more neural networks included in TKG 242 and/or other machine learning models involved in perception, navigation, and/or other tasks.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. Pat. No. 10,685,698, issued Jan. 5, 2021. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding shape dimensions, ground plane estimate obtained (e.g. from another subsystem), IMU sensor 966 output that correlates with the vehicle 900 orientation, distance, 3D location estimates of the object obtained from the neural network and/or other sensors (e.g., LIDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks (e.g., neural networks included in TKG 242) for redundancy and safety. The data store(s) 916 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management; a high-dynamic range signal processor that may include an image signal processor that is a hardware engine that is part of the camera processing pipeline; and/or a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LIDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks (e.g., neural networks in TKG 242) to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK). The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS, assisted GPS sensors, differential GPS (DGPS) sensors, etc.), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multi-modal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LIDAR sensor(s) 964. The LIDAR sensor(s) 964 may be used for object and pedestrian detection, emergency braking, collision avoidance, and/or other functions. The LIDAR sensor(s) 964 may be functional safety level ASIL B. In some examples, the vehicle

900 may include multiple LIDAR sensors 964 (e.g., two, four, six, etc.) that may use Ethernet (e.g., to provide data to a Gigabit Ethernet switch).

In some examples, the LIDAR sensor(s) 964 may be capable of providing a list of objects and their distances for a 360-degree field of view. Commercially available LIDAR sensor(s) 964 may have an advertised range of approximately 900 m, with an accuracy of 2 cm-3 cm, and with support for a 900 Mbps Ethernet connection, for example. In some examples, one or more non-protruding LIDAR sensors 964 may be used. In such examples, the LIDAR sensor(s) 964 may be implemented as a small device that may be embedded into the front, rear, sides, and/or corners of the vehicle 900. The LIDAR sensor(s) 964, in such examples, may provide up to a 120-degree horizontal and 35-degree vertical field-of-view, with a 200 m range even for low-reflectivity objects. Front-mounted LIDAR sensor(s) 964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit may include a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 900. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, an accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LIDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (12V) communication link. In general, the V2V communication concept provides information about the immediately preceding vehicles (e.g., vehicles immediately ahead of and in the same lane as the vehicle 900), while the I2V communication concept provides information about traffic further ahead. CACC systems may include either or both I2V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
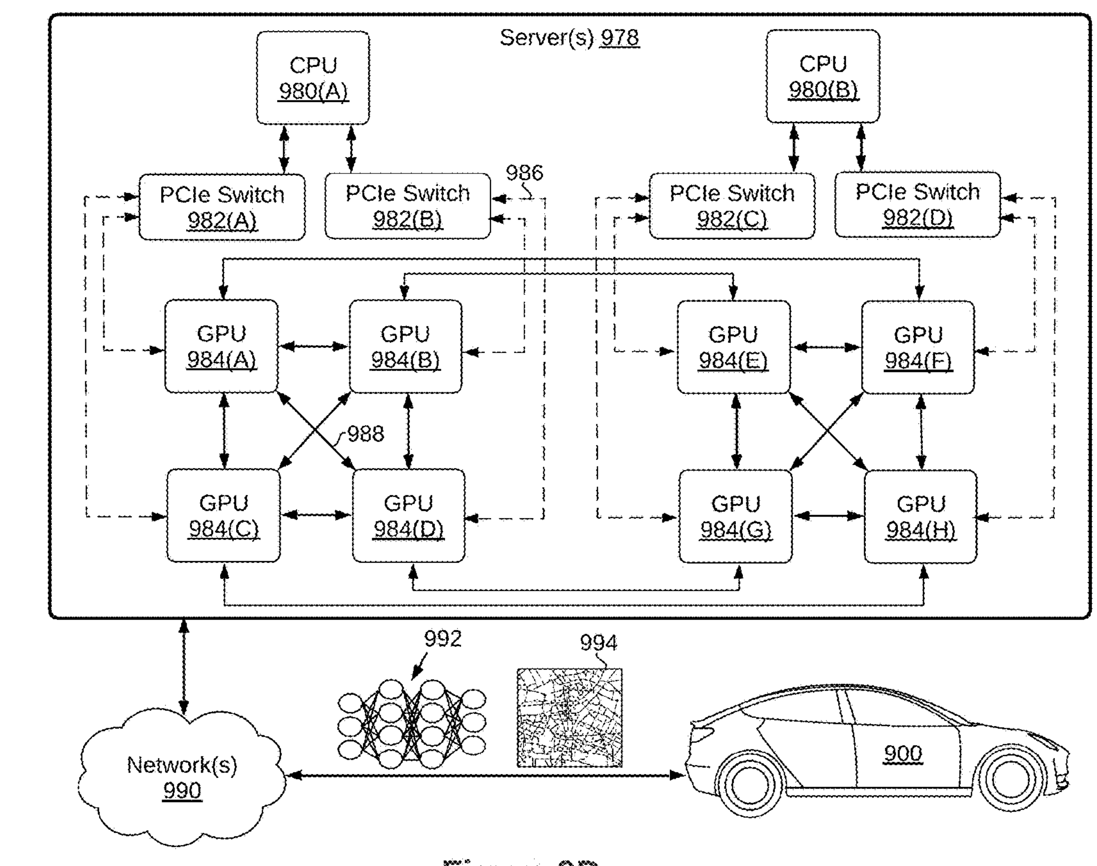
FIG. 9D is a system diagram for communication between cloud-based server(s) and the example autonomous vehicle of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984(H) (collectively referred to herein as GPUs 984), PCIe switches 982(A)-982(H) (collectively referred to herein as PCIe switches 982), and/or CPUs 980(A)-980(B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers). In various examples, the neural networks 992 and/or updated neural networks 992 may include components of TKG 242. The neural networks 992 and/or updated neural networks 992 may be trained (at least in part) using simulation data 232, goals 234, commands 236, records 238, and/or datasets 240 generated by data-generation engine 122.

The server(s) 978 may be used to train machine learning models (e.g., neural networks, TKG 242, etc.) based on training data. The training data may be generated by the vehicles, and/or may be generated in a simulation (e.g., using a game engine, data-generation engine 122, etc.). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 990, and/or the machine learning models may be used by the server(s) 978 to remotely monitor the vehicles.

In some examples, the server(s) 978 may receive data from the vehicles and apply the data to up-to-date real-time neural networks for real-time intelligent inferencing. The server(s) 978 may include deep-learning supercomputers and/or dedicated AI computers powered by GPU(s) 984, such as a DGX and DGX Station machines developed by NVIDIA. However, in some examples, the server(s) 978 may include deep learning infrastructure that use only CPU-powered datacenters.

The deep-learning infrastructure of the server(s) 978 may be capable of fast, real-time inferencing, and may use that capability to evaluate and verify the health of the processors, software, and/or associated hardware in the vehicle 900. For example, the deep-learning infrastructure may receive periodic updates from the vehicle 900, such as a sequence of images and/or objects that the vehicle 900 has located in that sequence of images (e.g., via computer vision and/or other machine learning object classification techniques). The deep-learning infrastructure may run its own neural network to identify the objects and compare them with the objects identified by the vehicle 900 and, if the results do not match and the infrastructure concludes that the AI in the vehicle 900 is malfunctioning, the server(s) 978 may transmit a signal to the vehicle 900 instructing a fail-safe computer of the vehicle 900 to assume control, notify the passengers, and complete a safe parking maneuver.

For inferencing, the server(s) 978 may include the GPU(s) 984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Other variations are within spirit of present disclosure. Thus, while disclosed techniques are susceptible to various modifications and alternative constructions, certain illustrated embodiments thereof are shown in drawings and have been described herein in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but may include non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In the scope of this application, the term arithmetic logic unit, or ALU, is used to refer to any computational logic circuit that processes operands to produce a result. For example, in the present document, the term ALU can refer to a floating-point unit, a DSP, a tensor core, a shader core, a coprocessor, or a CPU.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously, or intermittently. In at least one embodiment, terms "system" and "method" are used herein interchangeably insofar as system may embody one or more methods and methods may be considered a system.

In the present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

1. A method comprising querying a temporal knowledge graph to predict a next action that a robotic system is to execute in an environment, the temporal knowledge graph including a graph representation of entities and relationships between the entities in the environment that are produced based at least on sensor data captured from the environment; receiving additional sensor data captured from the environment; generating, using a machine learning model, spatial and temporal data associated with the additional sensor data; and updating, using the machine learning model, the temporal knowledge graph to include representations of the spatial and temporal data based at least on a similarity between the spatial and temporal data and the graph representation.

2. The method of clause 1, wherein the temporal knowledge graph maintains a history of entities and relationships between the entities over a time period, and wherein the querying further comprises querying the history to predict the next action that the robotic system is to execute.

3. The method of clause 1 or clause 2, further comprising: (i) querying the temporal knowledge graph to identify a subgraph that is similar to the additional sensor data; (ii) comparing the similarity to a predetermined threshold; and (iii) responsive to the similarity being above a predetermined threshold, adding entities to the temporal knowledge graph to update the underlying spatial representations for providing an updated prediction of the next action that the robotic system is to execute.

4. The method of any of clauses 1 to 3, wherein (iii) further comprises adding one or more relations among the entities in the temporal knowledge graph.

5. The method of any of clauses 1 to 4, further comprising: (iv) responsive to the similarity being below the predetermined threshold, merging entities in the temporal knowledge graph to provide an updated prediction of the next action that the robotic system is to execute.

6. The method of any of clauses 1 to 5, wherein (iv) further comprises altering the one or more relations in the temporal knowledge graph.

7. The method of any of clauses 1 to 6, wherein the machine learning model comprises a graph neural network (GNN), a large language model (LLM), a vision language model (VLM), a multi-modal language model (MMLM), or a large action model (LAM).

8. The method of any of clauses 1 to 7, wherein the robotic system comprises one or more of a robotic vehicle, a robotic arm, an autonomous or semi-autonomous vehicle, an aircraft, or a watercraft.

9. The method of any of clauses 1 to 8, further comprising employing simultaneous localization and mapping (SLAM) to generate SLAM data for the machine learning model to provide the spatial data.

10. The method of any of clauses 1-9, wherein the SLAM data is provided using one or more sensors of the robotic system, the one or more sensors comprising at least one of a light imaging detection and ranging (LiDAR) sensor, a global positioning system (GPS) sensor, a global navigation satellite system (GNSS), a visual camera, an infrared camera, a depth camera, a sonic sensor, or an ultrasonic sensor.

11. One or more processors comprising processing circuitry to: query a temporal knowledge graph to predict a next action that a robotic system is to execute in an environment, the temporal knowledge graph including a graph representation of entities and relationships between the entities in the environment that are produced based at least on sensor data captured from the environment; receive additional sensor data captured from the environment; generate, using a machine learning model, spatial and temporal data associated with the additional sensor data; and update, using the machine learning model, the temporal knowledge graph to include representations of the spatial and temporal data based at least on a similarity between the spatial and temporal data and the graph representation.

12. The one or more processors of clause 11, wherein the temporal knowledge graph maintains a history of entities and relationships between the entities over a time period, and wherein the processing circuitry further queries the history to predict the next action that the robotic system is to execute.

13. The one or more processors of clause 11 or clause 12, wherein the processing circuitry further: (i) queries the temporal knowledge graph to identify a subgraph that is similar to the additional sensor data; (ii) compares the similarity to a predetermined threshold; and (iii) responsive to the similarity being above a predetermined threshold, adds entities to the temporal knowledge graph to update the underlying spatial representations for providing an updated prediction of the next action that the robotic system is to execute.

14. The one or more processors of any of clauses 11 to 13, wherein (iii) further comprises adding one or more relations among the entities in the temporal knowledge graph.

15. The one or more processors of any of clauses 11 to 14, wherein the processing circuitry further: (iv) responsive to the similarity being below the predetermined threshold, merges entities in the temporal knowledge graph to provide an updated prediction of the next action that the robotic system is to execute.

16. The one or more processors of any of clauses 11 to 15, wherein (iv) further comprises altering the one or more relations in the temporal knowledge graph.

17. The one or more processors of any of clauses 11 to 16, wherein the machine learning model comprises a graph neural network (GNN), a large language model (LLM), a vision language model (VLM), a multi-modal large language model (MMLM), or a large action model (LAM).

18. The one or more processors of any of clauses 11 to 17, wherein the one or more processors are comprised in at least one of: a control system for the robotic system; a perception system for the robotic system; a system for performing simulation operations; a system for performing digital twin operations; a system for performing light transport simulation; a system for performing collaborative content creation for 3D assets; a system for performing one or more deep learning operations; a system implemented using an edge device; a system for generating or presenting at least one of virtual reality content, augmented reality content, or mixed reality content; a system implemented using a robot; a system for performing one or more conversational AI operations; a system implemented using one or more large language models (LLMs); a system implementing one or more vision language models (VLMs); a system implementing one or more multi-modal language models (MMLMs); a system implementing one or more large action models (LAMs); a system implementing one or more graph neural networks (GNNs); a system for generating synthetic data; a system for performing one or more generative AI operations; a system incorporating one or more virtual machines (VMs); a system implemented at least partially in a data center; or a system implemented at least partially using cloud computing resources.

19. A system comprising one or more processors to: query a temporal knowledge graph to predict a next action that a robotic system is to execute in an environment; receive sensor data captured from the environment; generate, via a machine learning model, spatial and temporal data associated with the additional sensor data; and update, via the machine learning model, the temporal knowledge graph to include representations of the spatial and temporal data based at least on a similarity between the spatial and temporal data and the graph representation.

20. The system of clause 19, wherein the system is comprised in at least one of: a control system for the robotic system; a perception system for the robotic system; a system for performing simulation operations; a system for performing digital twin operations; a system for performing light transport simulation; a system for performing collaborative content creation for 3D assets; a system for performing one or more deep learning operations; a system implemented using an edge device; a system for generating or presenting at least one of virtual reality content, augmented reality content, or mixed reality content; a system implemented using a robot; a system for performing one or more conversational AI operations; a system implemented using one or more large language models (LLMs); a system implementing one or more vision language models (VLMs); a system implementing one or more multi-modal language models (MMLMs); a system implementing one or more large action models (LAMs); a system implementing one or more graph neural networks (GNNs); a system for generating synthetic data; a system for performing one or more generative AI operations; a system incorporating one or more virtual machines (VMs); a system implemented at least partially in a data center; or a system implemented at least partially using cloud computing resources.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

querying a temporal knowledge graph to predict a next action that a robotic system is to execute in an environment, the temporal knowledge graph including a graph representation of entities and relationships between the entities in the environment that are produced based at least on sensor data captured from the environment;

receiving additional sensor data captured from the environment;

generating, using a machine learning model, spatial and temporal data associated with the additional sensor data; and updating, using the machine learning model, the temporal knowledge graph to include representations of the spatial and temporal data based at least on a similarity between the spatial and temporal data and the graph representation.

2. The method of claim 1, wherein the temporal knowledge graph maintains a history of entities and relationships between the entities over a time period, and wherein the querying further comprises querying the history to predict the next action that the robotic system is to execute.

3. The method of claim 1, further comprising:

(i) querying the temporal knowledge graph to identify a subgraph that is similar to the additional sensor data;

(ii) comparing the similarity to a predetermined threshold; and (iii) responsive to the similarity being above a predetermined threshold, adding entities to the temporal knowledge graph to update the underlying spatial representations for providing an updated prediction of the next action that the robotic system is to execute.

4. The method of claim 3, wherein (iii) further comprises adding one or more relations among the entities in the temporal knowledge graph.

5. The method of claim 3, further comprising:

(iv) responsive to the similarity being below the predetermined threshold, merging entities in the temporal knowledge graph to provide an updated prediction of the next action that the robotic system is to execute.

6. The method of claim 5, wherein (iv) further comprises altering the one or more relations in the temporal knowledge graph.

7. The method of claim 1, wherein the machine learning model comprises a graph neural network (GNN), a large language model (LLM), a vision language model (VLM), a multi-modal language model (MMLM), or a large action model (LAM).

8. The method of claim 1, wherein the robotic system comprises one or more of a robotic vehicle, a robotic arm, an autonomous or semi-autonomous vehicle, an aircraft, or a watercraft.

9. The method of claim 1, further comprising employing simultaneous localization and mapping (SLAM) to generate SLAM data for the machine learning model to provide the spatial data.

10. The method of claim 9, wherein the SLAM data is provided using one or more sensors of the robotic system, the one or more sensors comprising at least one of a light imaging detection and ranging (LiDAR) sensor, a global positioning system (GPS) sensor, a global navigation satellite system (GNSS), a visual camera, an infrared camera, a depth camera, a sonic sensor, or an ultrasonic sensor.

11. One or more processors comprising processing circuitry to:

query a temporal knowledge graph to predict a next action that a robotic system is to execute in an environment, the temporal knowledge graph including a graph representation of entities and relationships between the entities in the environment that are produced based at least on sensor data captured from the environment;

receive additional sensor data captured from the environment;

generate, using a machine learning model, spatial and temporal data associated with the additional sensor data; and update, using the machine learning model, the temporal knowledge graph to include representations of the spatial and temporal data based at least on a similarity between the spatial and temporal data and the graph representation.

12. The one or more processors of claim 11, wherein the temporal knowledge graph maintains a history of entities and relationships between the entities over a time period, and wherein the processing circuitry further queries the history to predict the next action that the robotic system is to execute.

13. The one or more processors of claim 11, wherein the processing circuitry further:

(i) queries the temporal knowledge graph to identify a subgraph that is similar to the additional sensor data;

(ii) compares the similarity to a predetermined threshold; and (iii) responsive to the similarity being above a predetermined threshold, adds entities to the temporal knowledge graph to update the underlying spatial representations for providing an updated prediction of the next action that the robotic system is to execute.

14. The one or more processors of claim 13, wherein in (iii) the processing circuitry further adds one or more relations among the entities in the temporal knowledge graph.

15. The one or more processors of claim 13, wherein the processing circuitry further:

(iv) responsive to the similarity being below the predetermined threshold, merges entities in the temporal knowledge graph to provide an updated prediction of the next action that the robotic system is to execute.

16. The one or more processors of claim 15, wherein (iv) further comprises altering the one or more relations in the temporal knowledge graph.

17. The one or more processors of claim 11, wherein the machine learning model comprises a graph neural network (GNN), a large language model (LLM), a vision language model (VLM), a multi-modal large language model (MMLM), or a large action model (LAM).

18. The one or more processors of claim 11, wherein the one or more processors are comprised in at least one of:

a control system for the robotic system;
a perception system for the robotic system;
a system for performing simulation operations;
a system for performing digital twin operations;
a system for performing light transport simulation;
a system for performing collaborative content creation for 3D assets;
a system for performing one or more deep learning operations;
a system implemented using an edge device;
a system for generating or presenting at least one of virtual reality content, augmented reality content, or mixed reality content;
a system implemented using a robot;
a system for performing one or more conversational AI operations;
a system implemented using one or more large language models (LLMs);
a system implementing one or more vision language models (VLMs);
a system implementing one or more multi-modal language models (MMLMs);
a system implementing one or more large action models (LAMs);
a system implementing one or more graph neural networks (GNNs);
a system for generating synthetic data;
a system for performing one or more generative AI operations;
a system incorporating one or more virtual machines (VMs);
a system implemented at least partially in a data center; or
a system implemented at least partially using cloud computing resources.

19. A system comprising one or more processors to:

query a temporal knowledge graph to predict a next action that a robotic system is to execute in an environment;
receive sensor data captured from the environment;
generate, via a machine learning model, spatial and temporal data associated with the additional sensor data; and
update, via the machine learning model, the temporal knowledge graph to include representations of the spatial and temporal data based at least on a similarity between the spatial and temporal data and the graph representation.

20. The system of claim 19, wherein the system is comprised in at least one of:

a control system for the robotic system;
a perception system for the robotic system;
a system for performing simulation operations;
a system for performing digital twin operations;
a system for performing light transport simulation;
a system for performing collaborative content creation for 3D assets;
a system for performing one or more deep learning operations;
a system implemented using an edge device;
a system for generating or presenting at least one of virtual reality content, augmented reality content, or mixed reality content;
a system implemented using a robot;
a system for performing one or more conversational AI operations;
a system implemented using one or more large language models (LLMs);
a system implementing one or more vision language models (VLMs);
a system implementing one or more multi-modal language models (MMLMs);
a system implementing one or more large action models (LAMs);
a system implementing one or more graph neural networks (GNNs);
a system for generating synthetic data;
a system for performing one or more generative AI operations;
a system incorporating one or more virtual machines (VMs);
a system implemented at least partially in a data center; or
a system implemented at least partially using cloud computing resources.

* * * * *